US012568342B2

(12) United States Patent
Oomen

(10) Patent No.: US 12,568,342 B2
(45) Date of Patent: Mar. 3, 2026

(54) GENERATING AN AUDIO SIGNAL ASSOCIATED WITH A VIRTUAL SOUND SOURCE

(71) Applicant: LIQUID OXIGEN (LOX) B.V., Amsterdam (NL)

(72) Inventor: Paulus Oomen, Amsterdam (NL)

(73) Assignee: LIQUID OXIGEN (LOX) B.V., Amsterdam (NL)

( * ) Notice: Subject to any disclaimer, the term of this patent is extended or adjusted under 35 U.S.C. 154(b) by 302 days.

(21) Appl. No.: 17/784,466

(22) PCT Filed: Dec. 10, 2020

(86) PCT No.: PCT/NL2020/050774

§ 371 (c)(1),
(2) Date: Jun. 10, 2022

(87) PCT Pub. No.: WO2021/118352

PCT Pub. Date: Jun. 17, 2021

(65) Prior Publication Data

US 2023/0017323 A1 Jan. 19, 2023

(30) Foreign Application Priority Data

Dec. 12, 2019 (NL) ...................................... 2024434
Jun. 30, 2020 (NL) ...................................... 2025950

(51) Int. Cl.
*H04S 7/00* (2006.01)
*H04S 5/00* (2006.01)

(52) U.S. Cl.
CPC .............. *H04S 7/302* (2013.01); *H04S 5/005* (2013.01)

(58) Field of Classification Search
CPC .......... H04S 7/302; H04S 5/005; H04S 7/305; H04S 5/00; G10H 2210/281; H04R 1/403; H04R 3/12
(Continued)

(56) References Cited

U.S. PATENT DOCUMENTS 5,555,306 A 9/1996 Gerzon
2003/0007648 A1* 1/2003 Currell .................... H04S 7/305 381/63
(Continued)

FOREIGN PATENT DOCUMENTS

CN 202197400 U 4/2012
JP S55-066200 A 5/1980
(Continued)

OTHER PUBLICATIONS

Schissler et al. ("Efficient HRTF-based Spatial Audio for Area and Volumetric Sources", IEEE Transactions on Visualization and Computer Graphics, vol. 22, No. 4, Apr. 2016) (Year: 2016).*
(Continued)

*Primary Examiner* — Vivian C Chin
*Assistant Examiner* — Douglas J Suthers
(74) *Attorney, Agent, or Firm* — Steven M. Koehler; Westman, Champlin & Koehler, P.A.

(57) ABSTRACT

A method for generating an audio signal associated with a virtual sound source is disclosed. The method comprises obtaining an input audio signal x(t) and modifying the input audio signal x(t) to obtain a modified audio signal. The latter step comprises performing a signal delay operation. Optionally, modifying the input audio signal comprises a signal inverting operation and/or a signal amplification or attenuation and/or a signal feedback operation. The method further comprises generating the audio signal y(t) based on a
(Continued)

combination, e.g. a summation, of the input audio signal x(t) and the modified audio signal.

24 Claims, 23 Drawing Sheets

(58) Field of Classification Search
USPC .................................... 381/300, 61, 63, 98
See application file for complete search history.

(56) References Cited

U.S. PATENT DOCUMENTS

| | | | |
|---|---|---|---|
| 2006/0120534 | A1 | 6/2006 | Seo et al. |
| 2006/0165238 | A1 | 7/2006 | Spille et al. |
| 2007/0203598 | A1 | 8/2007 | Seo et al. |
| 2010/0322428 | A1 | 12/2010 | Fukui et al. |
| 2014/0010372 | A1 | 1/2014 | Seo et al. |
| 2016/0007133 | A1 | 1/2016 | Mateos Sole et al. |
| 2017/0238116 | A1 | 8/2017 | Mateos Sole et al. |
| 2018/0167756 | A1 | 6/2018 | Mateos Sole et al. |
| 2019/0020968 | A1 * | 1/2019 | Suenaga ................ H04S 7/303 |
| 2020/0126582 | A1 | 4/2020 | Yamamoto et al. |
| 2020/0336855 | A1 | 10/2020 | Mateos Sole et al. |
| 2020/0404442 | A1 | 12/2020 | Suenaga et al. |

FOREIGN PATENT DOCUMENTS

| | | | |
|---|---|---|---|
| JP | H03-065400 | U | 6/1991 |
| JP | H06-105400 | A | 4/1994 |
| WO | 2004036548 | A1 | 4/2004 |
| WO | 2014159272 | A1 | 10/2014 |
| WO | 2018198767 | A1 | 11/2018 |

OTHER PUBLICATIONS

Békésy, G. “Chapter 8: The Spatial Attributes of Sounds: Perception of the Distance of a Sound Source”, Experiments in Hearing, 1960, pp. 301-313, McGraw Hill Book Company, Inc., New York, U.S.A.

Békésy, G. “Chapter 10: Room Acoustics: Optimum Reverberation Time”, Experiments in Hearing, 1960, pp. 369-383, McGraw Hill Book Company, Inc., New York, U.S.A.

International Search Report and Written Opinion in corresponding International Application No. PCT/NL2020/050774 dated Mar. 10, 2021.

Békésy, G. “Improved Musical Dynamics by Variation of Apparent Size of Sound Source”, Journal of Music Theory, 1970, pp. 141-164, vol. 14, No. 2.

Office Action in corresponding Chinese application serial No. 202080093387.3 dated Feb. 26, 2025.

Office Action in corresponding Japanese application serial No. 2022-536511 dated Jan. 21, 2025.

Dipert, B. “Decoding and Virtual Technology Facilitate the Popularization of Surround Sound”, EDN China, Mar. 2002, 5 pages.

* cited by examiner

GENERATING AN AUDIO SIGNAL ASSOCIATED WITH A VIRTUAL SOUND SOURCE

CROSS REFERENCE TO RELATED APPLICATION(S)

This Application is a Section 371 National Stage Application of International Application No. PCT/NL2020/050774, filed Dec. 10, 2020 and published as WO 2021/118352 A1 on Jun. 17, 2021, and further claims priority to Netherlands Application Ser. No. 2024434, filed Dec. 12, 2019 and Netherlands Application Ser. No. 2025950, filed Jun. 30, 2020.

FIELD OF THE INVENTION

This disclosure relates to a method and system for generating an audio signal associated with a virtual sound source. In particular to such method and system wherein an input audio signal x(t) is modified to obtain a modified audio signal and wherein the modification comprises performing a signal delay operation. The audio signal y(t) is generated based on a combination. e.g. a summation, of the input audio signal x(t) and the modified audio signal.

BACKGROUND

In the playback of sound through audio transmitters, i.e. loudspeakers, much of the inherent spatial information of the (recorded) sound is lost. Therefore, the experience of sound through speakers is often felt to lack depth (it sounds 'flat') and dimensionality (it sounds 'in-the-box'). The active perception of height is altogether missing from the sound experience across the speakers. These conditions create an inherent detachment between the listener and sound in the environment. This creates an obstacle for the observer to fully identify physically and emotionally with the sound environment and in general this makes sound experiences more passive and less engaging.

A classical demonstration of this problem is described by Von Bekésy's (Experiments in Hearing, 1960): the 'in-the-box' sound effect seems to increase with the decrease of the loudspeaker's dimensions. In an experimental research on the relation between acoustic power, spectral balance and perceived spatial dimensions and loudness, Von Bekésy's test subjects were unable to correctly indicate the relative dimensional shape of a reproduced sound source as soon as the source's dimensions exceeded the actual shape of the reproducing loudspeaker box. One may conclude that the loudspeaker's spatio-spectral properties introduce a message-media conflict when transmitting sound information. We cannot recognize the spatial dimensions of the sound source in the reproduced sound. Instead, we listen to the properties of the loudspeaker.

In the prior art there is no satisfying approach to record or compute dimensional information of sound sources. The near-field information of sound producing objects cannot be accurately captured by microphones, or would theoretically require an infinite grid of pressure and particle velocity transducers to capture the dimensional information of the object.

For a computational simulation of dimensional information, solutions to the wave equation are only applicable to a limited amount of basic geometrical shapes and for a limited frequency range. Given the lack of an analytical solution to the problem, simulation models have to resort to finite computation methods to attempt to reproduce the desired data. The data gathered in this way and reproduced by means of techniques involving FFT (Fast Fourier Transform), such as convolution or additive synthesis, require complex calculations and very large amounts of data processing and are thus inherently very intensive for computer processing. This limits the application of such methods and poses a problem for the audio playback system that can accurately reproduce the information.

Hence, there is a need in the art for a method for generating audio signals associated with a virtual sound source that are less computationally expensive.

SUMMARY

To that end, a method for generating an audio signal associated with a virtual sound source is disclosed. The method comprising either (i) obtaining an input audio signal x(t), and modifying the input audio signal x(t) to obtain a modified audio signal using a signal delay operation introducing a time delay; and generating the audio signal y(t) based on a combination, e.g. a summation, of the input audio signal x(t), or of an inverted and/or attenuated or amplified version of the input audio signal x(t), and the modified audio signal. Alternatively (ii), the method comprises obtaining an input audio signal x(t), and generating the audio signal y(t) based on a signal feedback operation that recursively adds a modified version of the input audio signal x(t) to itself, wherein the signal feedback operation comprises a signal delay operation introducing a time delay and, optionally, a signal inverting operation.

When a virtual sound source is said to have a particular size and shape and/or to be positioned at a particular distance and/or to be positioned at a particular height or depth it may be understood as that an observer, when hearing the generated audio signal, perceives the audio signal as originating from a sound source having that particular size and shape and/or being positioned at said particular distance and/or at said particular height or depth. The human hearing is very sensitive, as also illustrated by the Von Bekésy experiment described above, to spectral information that correlates with the dimensions of the object producing the sound. The human hearing recognizes the features of a sounding object primarily by its resonance, i.e. the amplification of one or several fundamental frequencies and their correlating higher harmonics, such amplification resulting from standing waves that occur inside the object or space due to its particular size and shape. By adding and subtracting spectral information from the audio signal in such a way that its resulting spectrum will closely resemble the resonance of the intended object or space, one can at least partially overrule the spatio-spectral properties of the loudspeaker(s) and create a coherent spatial projection of the sound signal by means of its size and shape. The applicant has realized that such spatial information, related to the dimensions of a sound source and its virtual distance, height and depth in relation to an observer, can be added to an audio signal by performing relatively simple operations onto an input audio signal. In particular, the applicant has found that these simple operations are sufficient for generating an audio signal having properties such that the physiology of the human hearing apparatus causes an observer to perceive the audio signal as coming from a sound source having a certain position and dimensions, other than the position and dimensions of the loudspeakers that produce the sound. The above-described method does not require filtering or synthesizing individual (bands of) frequencies and amplitudes to add this spatial information to the input audio signal. The method thus bypasses the need for FFT synthesis techniques for such purpose, in this way simplifying the process and considerably reducing the processing power required.

Optionally, the method comprises playing back the generated audio signal, e.g. by providing the generated audio signal to one or more loudspeakers in order to have the generated audio signal played back by the one or more loudspeakers.

The generated audio signal, once played out by a loudspeaker system, causes the desired perception by an observer irrespective of how many loudspeakers are used and irrespective of the position of the observer relative to the loudspeakers.

A signal that is said to have been generated based on a combination of two or more signals may be the combination, e.g. the summation, of these two or more signals.

In an example, the generated audio signal is stored onto a computer readable medium so that it can be played out at a later time by a loudspeaker system.

The audio signal can be generated in real-time, which may be understood as that the audio signal is generated immediately as the input audio signal comes in and/or may be understood as that any variation in the input audio signal at a particular time is reflected in the generated audio signal within three seconds, preferably within 0.5 seconds, more preferably within 50 ms, most preferably within 10 ms. The relatively simple operations for generating the audio signal allows for such real-time processing. Optionally, the generated audio signal is played back in real-time, which may be understood as that the audio signal, once generated, is played back without substantial delay.

In an embodiment, the virtual sound source has a shape. Such embodiment comprises generating audio signal components associated with respective virtual points on the virtual sound source's shape. This step comprises generating a first audio signal component associated with a first virtual point on the virtual sound source's shape and a second audio signal component associated with a second virtual point on the virtual sound source's shape, wherein either (i)

generating the first audio signal component comprises modifying the input audio signal to obtain a modified first audio signal component using a first signal delay operation introducing a first time delay and comprises generating the first audio signal component based on a combination, e.g. a summation, of the input audio signal or of an inverted and/or attenuated or amplified version of the input audio signal x(t), and the modified first audio signal component, or wherein (ii)

generating the first audio signal component comprises using a feedback loop that recursively adds a modified version of the input audio signal x(t) to itself, wherein the feedback loop comprises a signal delay operation introducing a first time delay and a signal inverting operation. Further, in this embodiment, either (i)

generating the second audio signal component comprises modifying the input audio signal to obtain a modified second audio signal component using a second signal delay operation introducing a second time delay different from the first time delay and comprises generating the second audio signal component based on a combination. e.g. a summation, of the input audio signal or of an inverted and/or attenuated or amplified version of the input audio signal x(t), and the modified second audio signal component, or wherein (ii)

generating the second audio signal component comprises using a feedback loop that recursively adds a modified version of the input audio signal x(t) to itself, wherein the feedback loop comprises a signal delay operation introducing a second time delay and a signal inverting operation.

The applicant has found out that this embodiment allows to add the dimensional information of the virtual sound source to the input audio signal x(t) in a simple manner, without requiring complex algorithms, such as FFT algorithms, additive synthesis of individual frequency bands or multitudes of bandpass filters to obtain the desired result, as has been the case in the prior art.

Preferably, many more than two virtual points may be defined on the virtual sound source's shape. An arbitrary number of virtual points may be defined on the shape of the virtual sound source. For each of these virtual points, an audio signal component may be determined. Each determination of audio signal component may then comprise determining a modified audio signal component using a signal delay operation introducing a respective time delay. Each audio signal component may then be determined based on a combination, e.g. a summation, of its modified audio signal component and the input audio signal.

Each determination of a modified audio signal component may further comprise performing a signal inverting operation and/or a signal amplification or attenuation and/or a signal feedback operation. Herein, preferably, the signal feedback operation is performed last. In principle, the signal inverting operation, amplification/attenuation and signal delay operation may be performed in any order.

The virtual points may be positioned equidistant from each other on the shape of the virtual sound source. Further, the virtual sound source may have any shape, such as a one-dimensional shape, e.g. a 1D string, a two-dimensional shape, e.g. a 2D plate shape, or a three-dimensional shape, e.g. a 3D cube.

The time period with which an audio signal is delayed may be zero for some audio signal components. To illustrate, if the virtual sound source is a string, the time delay for the two virtual points at the respective ends of the string where its vibration is restricted, may be zero. This will be illustrated below with reference to the figures.

In an embodiment, the method comprises obtaining shape data representing the virtual positions of the respective virtual points on the virtual sound source's shape and determining the first resp. second time delay based on the virtual position of the first resp. second virtual point. Thus, the respective time delays for determining the respective audio signal components for the different virtual points may be determined based on the respective virtual positions of these virtual points.

The applicant has found out that this embodiment enables to take into account how sound waves propagate through a dimensional shape, which enables to accurately generate audio signals that are perceived by an observer to originate from a sound source having that particular shape. When generated audio signal components associated with the virtual points are played back through a loudspeaker, or distributed across multiple loudspeakers, the result is perceived as one coherent sound source in space because the signal components strengthen their coherence at corresponding wavelengths in harmonic ratios according to the fundamental resonance frequencies of the virtual shape. This at least partially overrules the mechanism of the ear to detect its actual output components, i.e. the loudspeaker(s).

Preferably, the time period for each time delayed version of the audio input signal is determined following a relationship between spatial dimensions and time, examples of which are given below in the figure descriptions.

In an embodiment, the to be generated audio signal y(t) is associated with a virtual sound source having a distance from an observer. This embodiment comprises (i) modifying the input audio signal using a time delay operation introducing a time delay and a signal feedback operation to obtain a first modified audio signal, and (ii) generating a second modified audio signal based on a combination of the input audio signal x(t) and the first modified audio signal; and (iii) generating the audio signal y(t) based on the second modified audio signal, this step comprising attenuating the second modified audio signal and optionally comprising performing a time delay operation introducing a second time delay.

The human hearing recognizes a sound source distance detecting primarily the changes in the overall intensity of the auditory stimulus and the proportionally faster dissipation of energy from the high to the lower frequencies. The applicant has found out that this embodiment allows to add such distance information to the input audio signal in a very simple and computationally inexpensive manner.

The second introduced time delay may be used to cause a Doppler effect for the observer. This embodiment further allows controlling a Q-factor, which narrows or widens the bandwidth of the resonant frequencies in the signal. In this case, since the perceived resonant frequency is infinitely low at the furthest possible virtual distance, the Q-factor influences the steepness of a curve covering the entire audible frequency range from high to the low frequencies, resulting in the intended gradual increase of high-frequency dissipation in the signal.

Preferably, the time delay introduced by the time delay operation that is performed to obtain the first modified audio signal is shorter than 0.00007 seconds, preferably shorter than 0.00005 seconds, more preferably shorter than 0.00002 seconds, most preferably approximately 0.00001 seconds.

The second modified audio signal may be attenuated in dependence of the distance of the virtual sound source. For the signal feedback operation that is performed in order to determine the first modified audio signal, in which an attenuated version of a signal is recursively added to itself, the signal attenuation is preferably also performed in dependence of said distance. Optionally, such embodiment comprises obtaining distance data representing the distance of the virtual sound source so that the attenuation can be automatically appropriately controlled. This embodiment allows to "move" the virtual sound source towards and away from an observer by simply adjusting a few values.

In the above embodiment, the signal feedback operation comprises attenuating a signal, e.g. the signal as obtained after performing the time delay operation introducing said time delay, and recursively adding the attenuated signal to the signal itself. Such embodiment may further comprise controlling the degree of attenuation in the signal feedback operation and the degree of attenuation of the second modified audio signal in dependence of said distance, such that the larger the distance is, the lower the degree of attenuation in the signal feedback operation and the higher the degree of attenuation of the second modified audio signal.

In an embodiment, the virtual sound source has a distance from an observer. This embodiment comprises modifying the input audio signal to obtain a first modified audio signal using a signal feedback operation that recursively adds a modified version of the input audio signal to itself, wherein the feedback operation comprises a signal delay operation introducing a time delay, and generating the audio signal y(t) based on the first modified audio signal, this step comprising a signal attenuation and optionally a time delay operation introducing a second time delay, wherein, optionally, the embodiment further comprises generating a second modified audio signal based on a combination of the first modified audio signal and a time-delayed version of the first modified audio signal and generating the audio signal (y(t) based on the second modified audio signal thus based on the first modified audio signal.

The above considerations about the introduced time delays, also apply to the attenuation in this embodiment.

In an embodiment, in which the virtual sound source is positioned at a distance from an observer, and in which the second modified audio signal is attenuated in dependence of the distance, modifying the input audio signal to obtain the first modified audio signal comprises a particular signal attenuation. This embodiment comprises controlling the degree of attenuation of the particular signal attenuation and the degree of attenuation of the second modified audio signal in dependence of said distance, such that the larger the distance is, the lower the degree of attenuation of the particular signal attenuation and the higher the degree of attenuation of the second modified audio signal.

In an embodiment, the to be generated audio signal y(t) associated with a virtual sound source is positioned at a virtual height above an observer. In such embodiment, the method comprises (i) modifying the input audio signal x(t) using a signal inverting operation, a signal attenuation operation and a time delay operation introducing a time delay in order to obtain a third modified audio signal, and (ii) generating the audio signal based on a combination, e.g. a summation, of the input audio signal and the third modified audio signal.

The applicant has found out that this embodiment allows to, in a simple manner, generate audio signals that come from a virtual sound source positioned at a certain height.

In this embodiment, the introduced time delay is preferably shorter than 0.00007 seconds, preferably shorter than 0.00005 seconds, more preferably shorter than 0.00002 seconds, most preferably approximately 0.00001 seconds.

In the above embodiment, modifying the input audio signal to obtain the third modified audio signal optionally comprises performing a signal feedback operation. In a particular example, this step comprises recursively adding an attenuated version of a signal, e.g. the signal resulting from the time delay operation, signal attenuation operation and signal inverting operation that are performed to eventually obtain the third modified audio signal, to itself.

In an embodiment, the to be generated audio signal is associated with a virtual sound source that is positioned at a virtual depth below an observer. Such embodiment comprises modifying the input audio signal x(t) using a time delay operation introducing a time delay, a signal attenuation operation and a signal feedback operation in order to obtain a sixth modified audio signal. Performing the signal feedback operation e.g. comprises recursively adding an attenuated version of a signal, e.g. the signal resulting from the time delay operation and signal attenuation operation that are performed to eventually obtain the sixth modified audio signal, to itself. This embodiment further comprises generating the audio signal based on a combination of the input audio signal and the sixth modified audio signal.

In an embodiment, the virtual sound source is positioned at a virtual depth below an observer. This embodiment comprises generating the audio signal y(t) using a signal feedback operation that recursively adds a modified version of the input audio signal to itself, wherein the feedback operation comprises a signal delay operation introducing a time delay and a first signal attenuation operation.

In an embodiment, the virtual sound source is positioned at a virtual depth below an observer. This embodiment comprises modifying the input audio signal to obtain a sixth modified audio signal using a signal feedback operation that recursively adds a modified version of the input audio signal to itself, wherein the feedback operation comprises a signal delay operation introducing a time delay and a first signal attenuation, and generating the audio signal based on a combination of the sixth modified audio signal and time-delayed and attenuated version of the sixth modified audio signal.

In the above embodiments in which the virtual sound source is positioned at a virtual depth, the introduced time delay is preferably shorter than 0.00007 seconds, preferably shorter than 0.00005 seconds, more preferably shorter than 0.00002 seconds, most preferably approximately 0.00001 seconds.

In an embodiment, the method comprises receiving a user input indicative of the virtual sound source's shape and/or indicative of respective virtual positions of virtual points on the virtual sound source's shape and/or indicative of the distance between the virtual sound source and the observer and/or indicative of the height at which the virtual sound source is positioned above the observer and/or indicative of the depth at which the virtual sound source is positioned below the observer. This embodiment allows a user to input parameters relating to the virtual sound source, which allows to generate the audio signal in accordance with these parameters. This embodiment may comprise determining values of parameters as described herein and using these determined parameters to generate the audio signal.

In an embodiment, the method comprises generating a user interface enabling a user to input at least one of:

- the virtual sound source's shape,
- respective virtual positions of virtual points on the virtual sound source's shape,
- the distance between the virtual sound source and the observer,
- the height at which the virtual sound source is positioned above the observer,
- the depth at which the virtual sound source is positioned below the observer. This allows a user to easily input parameters relating to the virtual sound source and as such allows a user to easily control the virtual sound source.

The methods as described herein may be computer-implemented methods.

One aspect of this disclosure relates to a computer comprising a computer readable storage medium having computer readable program code embodied therewith, and a processor, preferably a microprocessor, coupled to the computer readable storage medium, wherein responsive to executing the computer readable program code, the processor is configured to perform one or more of the method steps as described herein for generating an audio signal associated with a virtual sound source.

One aspect of this disclosure relates to a computer program or suite of computer programs comprising at least one software code portion or a computer program product storing at least one software code portion, the software code portion, when run on a computer system, being configured for executing one or more of the method steps as described herein for generating an audio signal associated with a virtual sound source.

One aspect of this disclosure relates to a computer non-transitory computer-readable storage medium storing at least one software code portion, the software code portion, when executed or processed by a computer, is configured to perform one or more of the method steps as described herein for generating an audio signal associated with a virtual sound source.

One aspect of this disclosure relates to a user interface as described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit." "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including a functional or an object oriented programming language such as Java™, Scala. C++, Python or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer, server or virtualized server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), or graphics processing unit (GPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Sound waves inherently carry detailed information about the environment, and about the observer of sound within the environment. This disclosure describes a soundwave transformation (spatial wave transform, or SWT), a method for generating an audio signal, that is perceived to have spatially coherent properties with regards to the dimensional size and shape of the reproduced sound source, its relative distance towards the observer, its height or depth above or below the observer and its directionality if the source is moving towards or away from the observer.

Typically, the spatial wave transform is an algorithm executed by a computer with as input a digital audio signal (e.g. a digital recording) and as output one or multiple modified audio signal(s) which can be played back on conventional audio playback systems. Alternatively, the transform could also apply to analogue (non-digital) means of generating and/or processing audio signal(s). Playing back the modified sound signal(s) will give the observer an improved perception of dimensional size and shape of the reproduced sound source (f.i, a recorded signal of a violin will sound as if the violin is physically present) and the sound source's spatial distance, height and depth in relation to the observer (f.i, the violin sounds at distinctive distance from the listener, and height above or depth below), while masking the physical properties of the sound output medium. i.e. the loudspeaker(s) (that is, the violin does not sound as if it is coming from a speaker).

Figure 1A:
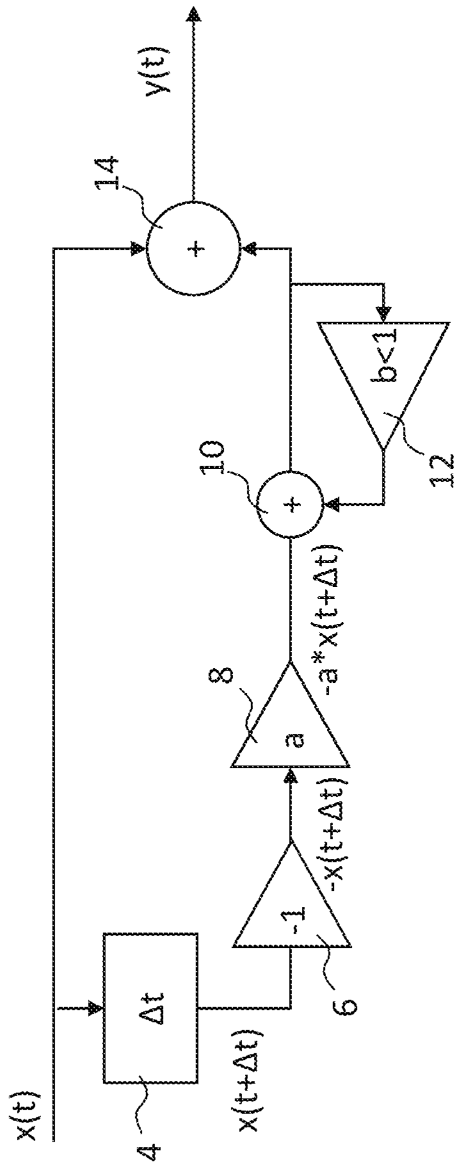
FIGS. 1A-1J illustrate methods and systems according to respective embodiments.
Figure 1B:
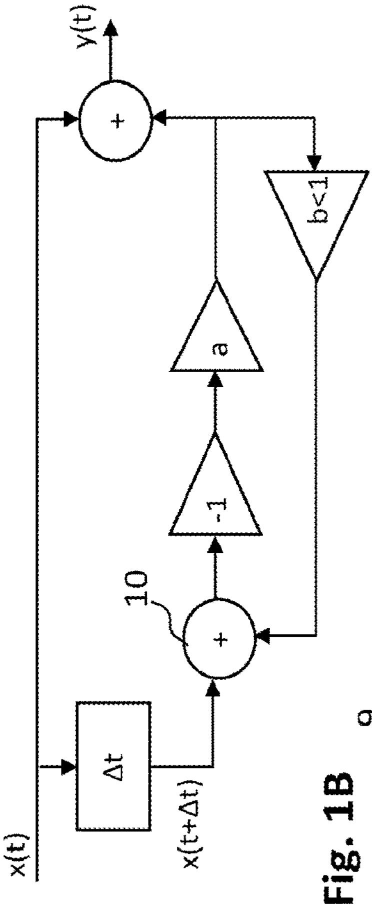

FIG. 1A is a flow chart depicting a method and/or system according to an embodiment. An input audio signal x(t) is obtained. The input audio signal x(t) may be analog or digital. Thus, the operations that are shown in FIG. 1. i.e. each of the operations 4, 6, 8, 10, 12, 14, may be performed by an analog circuit component or a digital circuit component. The flow chart of FIG. 1 may also be understood to depict method steps that can be performed by a computer executing appropriate software code.

The input audio signal x(t) may have been output by a recording process in which sounds have been recorded and optionally converted into a digital signal. In an example, a musical instrument, such as a violin, has been recorded in a studio to obtain the audio signal that is input for the method for generating the audio signal as described herein.

The input audio signal x(t) is subsequently modified to obtain a modified audio signal. The signal modification comprises a signal delay operation 4 and/or a signal inverting operation 6 and/or a signal amplification or attenuation 8 and/or a signal feedback operation 10, 12.

The signal delay operation 4 may be performed using well-known components, such as a delay line. The signal inverting operation 6 may be understood as inverting a signal such that an input signal x(t) is converted into −x(t). The amplification or attenuation 8 may be a linear amplification or attenuation, which may be understood as amplifying or attenuating a signal by a constant factor a, such that a signal x(t) is converted into a *x(t).

The signal feedback operation may be understood to comprise recursively combining a signal with an attenuated version of itself. This is schematically depicted by the attenuation operation 12 that sits in the feedback loop and the combining operation 10. Decreasing the attenuation, i.e. enlarging constant b in FIG. 1A, may increase the peak intensity and narrow the bandwidth of resonance frequencies in the spectrum of the sound, the so-called Q-factor.

Herewith, the response of different materials to vibrations can be simulated based on their density and stiffness. For instance, the response of a metal object will generate a higher Q-factor than an object of the same size and shape made out of wood.

The combining operations 10 and 14 may be understood to combine two or more signals $\{x_1(t), \ldots, x_n(t)\}$. The input signals may be converted into a signal y(t) as follows.

In FIG. 1A, the audio signal y(t) is generated based on a combination, e.g. a summation, of the input audio signal x(t) and the modified audio signal. In an example, the audio signal y(t) is the result of combining, e.g. summing, the input audio signal x(t) and the modified audio signal.

The transformation of the input audio signal x(t) to the audio signal y(t) may be referred to hereinafter as the Spatial Wave Transform (SWT).

The method for generating the audio signal y(t) does not require finite computational methods, such as methods involving Fast Fourier Transforms, which may limit the achievable resolution of the generated audio signal. Thus, the method disclosed herein enables to form high-resolution audio signals. Herein, high-resolution may be understood as a signal with spectral modifications for an infinite amount of frequency components. The virtually infinite resolution is achieved because the desired spectral information does not need to be computed and modified for each individual frequency component, as would be the case in convolution or simulation models, but the desired spectral modification of frequency components results from the simple summation, i.e. wave interference of two identical audio signals with a specific time delay, amplitude and/or phase difference. This operation results in phase and amplitude differences for each frequency component in harmonic ratios, i.e. corresponding to the spectral patterns caused by resonance. The time delays relevant to the method are typically between 0.00001-0.02 seconds, but not excluding longer times.

The generated audio signal y(t) may be presented to an observer through a conventional audio output medium, e.g. one or more loudspeakers. The generated audio signal may be delayed in time and/or attenuated before being output to the audio output medium.

FIGS. 1B-1G show flow charts depicting the method and/or system according to other embodiments. Herein, FIG. 1B differs from FIG. 1A in that the signal inverting operation and the signal attenuation operation are performed after the feedback combination 10.

Figure 1C:
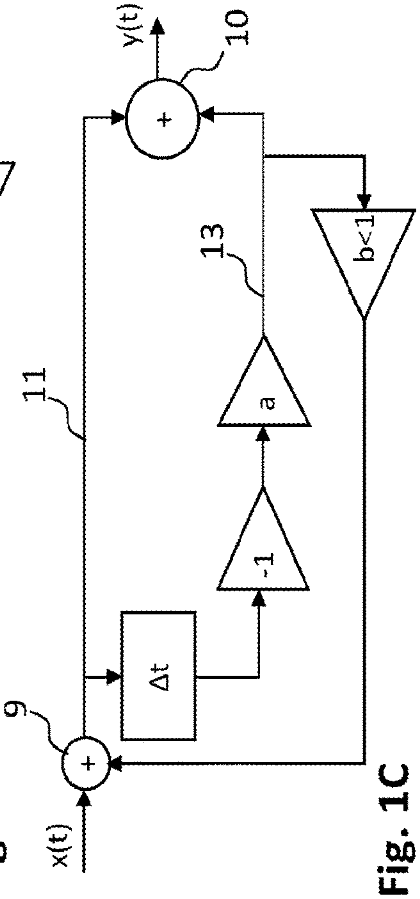
Figure 1D:
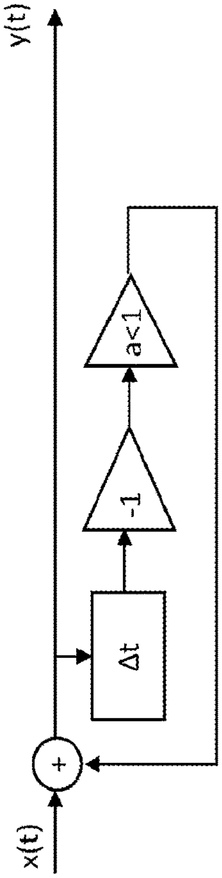

Further. FIGS. 1C and 1D illustrate respective embodiments wherein the audio signal y(t) is generated based on a signal feedback operation that recursively adds a modified version of the input audio signal x(t) to itself. The signal feedback operation comprises a signal delay operation introducing a time delay and a signal inverting operation.

Herein, FIG. 1C illustrates an embodiment, wherein the input audio signal is modified using a signal feedback operation to obtain a modified audio signal, indicated by 11. In this embodiment, the audio signal y(t) is generated based on a combination of this modified audio signal and a time-delayed, inverted version of this modified audio signal, indicated by 13. As shown in FIG. 1C, this may be achieved by feeding the signal that is fed back to combiner 9, also to combiner 10.

In FIGS. 1C and 1D, the damping function resulting from the signal feedback operation is independent of frequency and therefore, these embodiments may be understood to constitute all-pass filters.

Figure 1E:
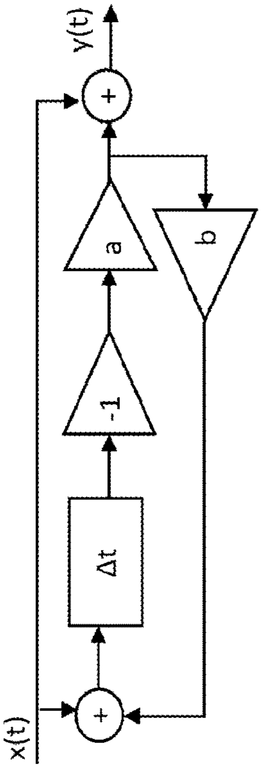

The embodiment of FIG. 1E differs from the one shown in FIG. 1A in that the signal delay operation, the signal inverting operation and the attenuation is performed as part of the signal feedback operation. The embodiment of FIG. 1E is especially advantageous in that it yields a harmonic pattern which comprises a damping function depending on frequency. Due to this damping function, the higher frequencies in the signal dampen faster than lower frequencies.

Figure 1F:
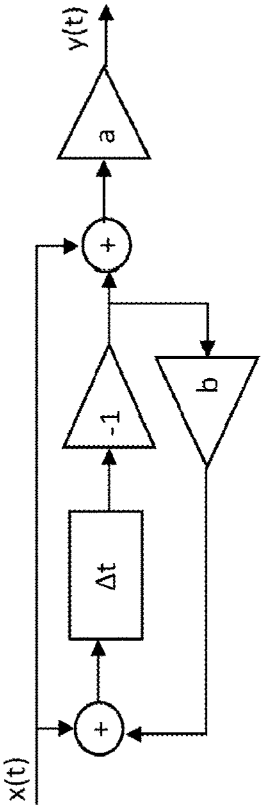
Figure 1G:
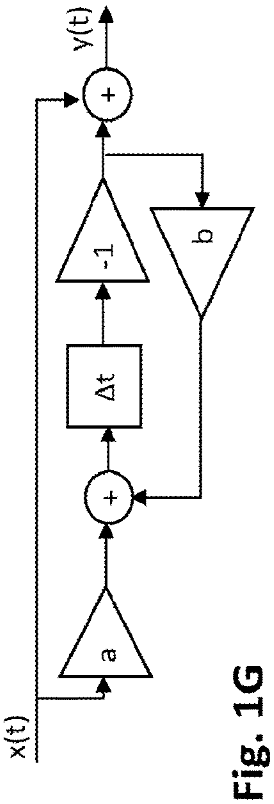

The embodiment of FIG. 1F resp. 1G illustrates respective embodiments wherein the signal attenuation is performed after respectively before the signal feedback operation. It should be appreciated that the signal attenuation may be arranged at any position in the flow diagram and also several signal attenuations may be present at respective positions in the flow diagram.

Figure 1H:
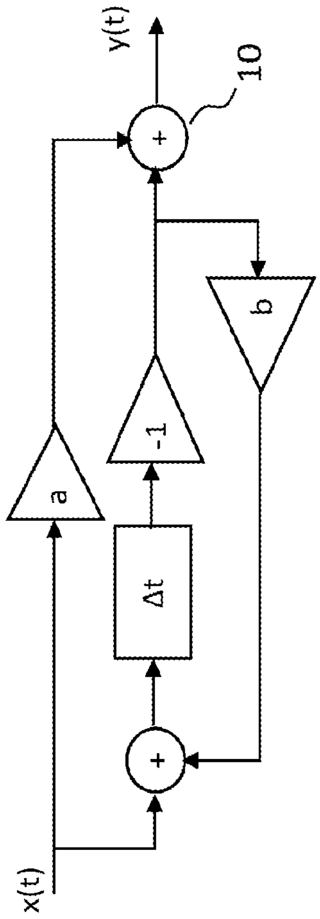
Figure 1I:
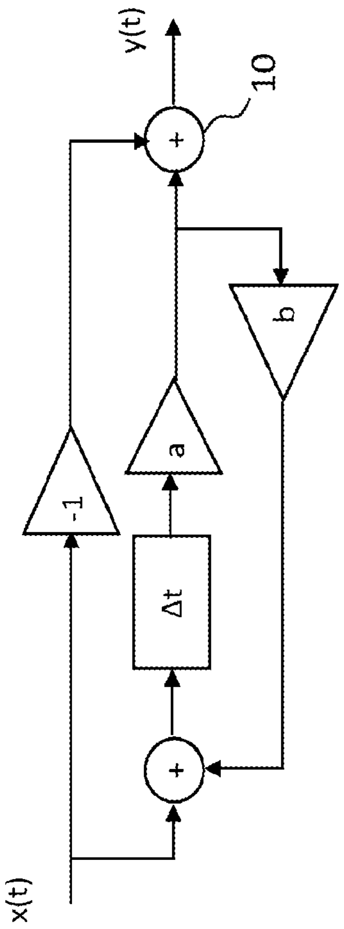
Figure 1J:
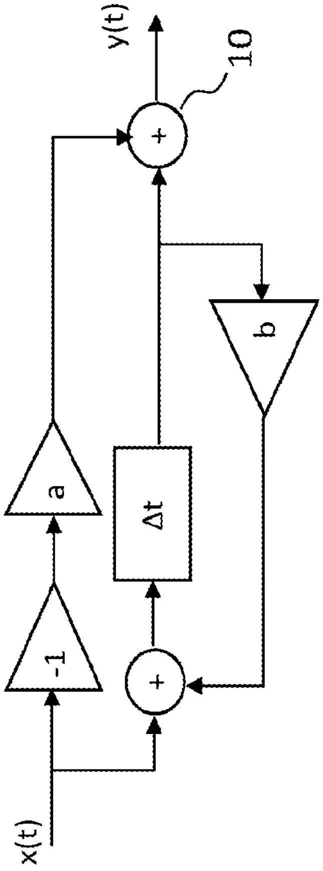

FIGS. 1H-1J illustrate respective embodiments wherein the audio signal y(t) is generated based on a combination 10 of an inverted and/or attenuated or amplified version of the input audio signal x(t) and a modified audio signal, wherein the modified audio signal is obtained using a signal delay operation and a signal feedback operation.

FIG. 1H illustrates an embodiment wherein the modified audio signal is combined with an attenuated version of the input audio signal, FIG. 1I illustrates an embodiment wherein the modified audio signal is combined with an inverted version of the input audio signal and FIG. 1J illustrates an embodiment wherein the modified audio signal is combined with an inverted, attenuated version of the input audio signal.

Figure 4:
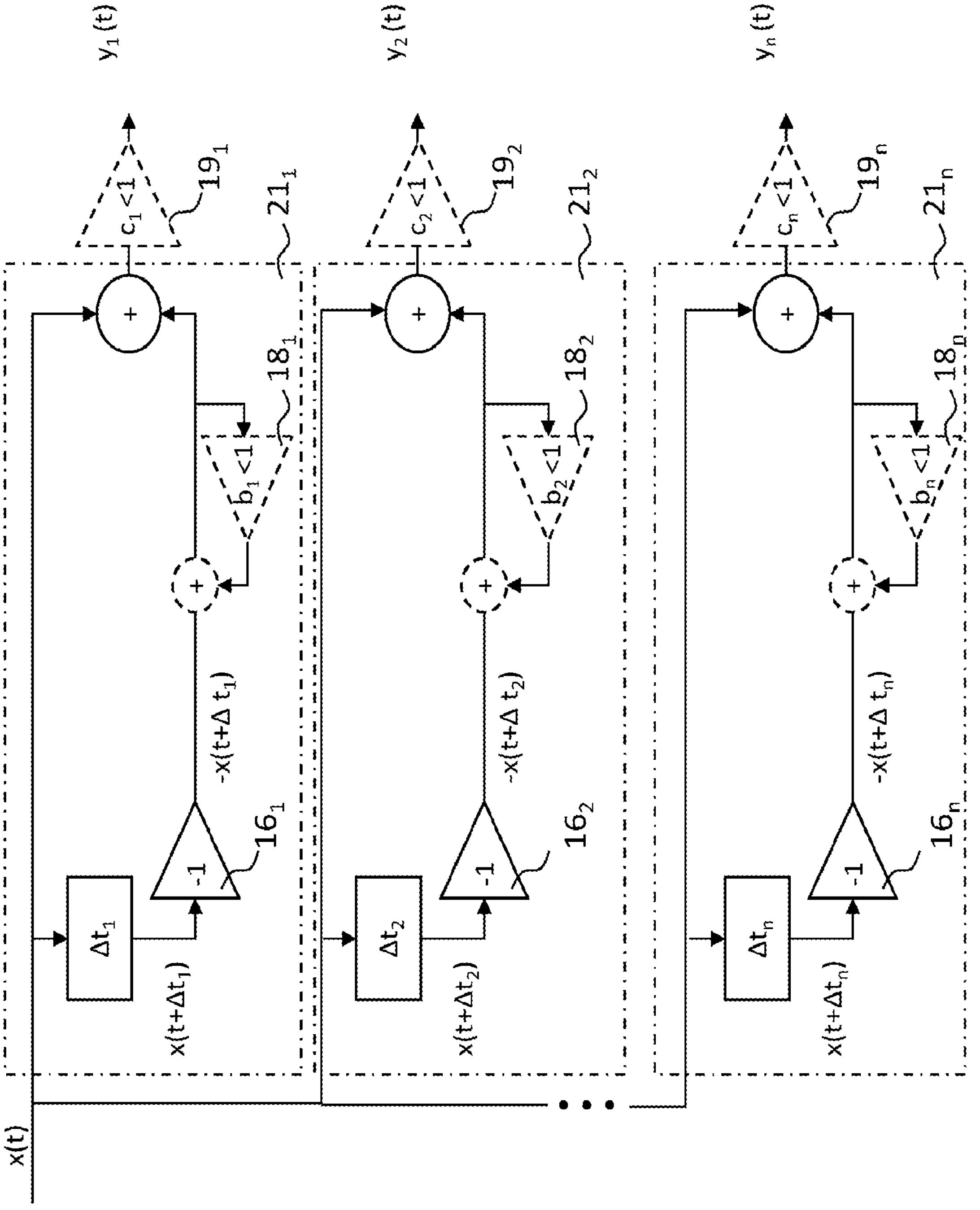
FIG. 4 illustrates a method for adding dimensional information to the audio signal, the dimensional information relating to a shape of the virtual sound source.
Figure 14:
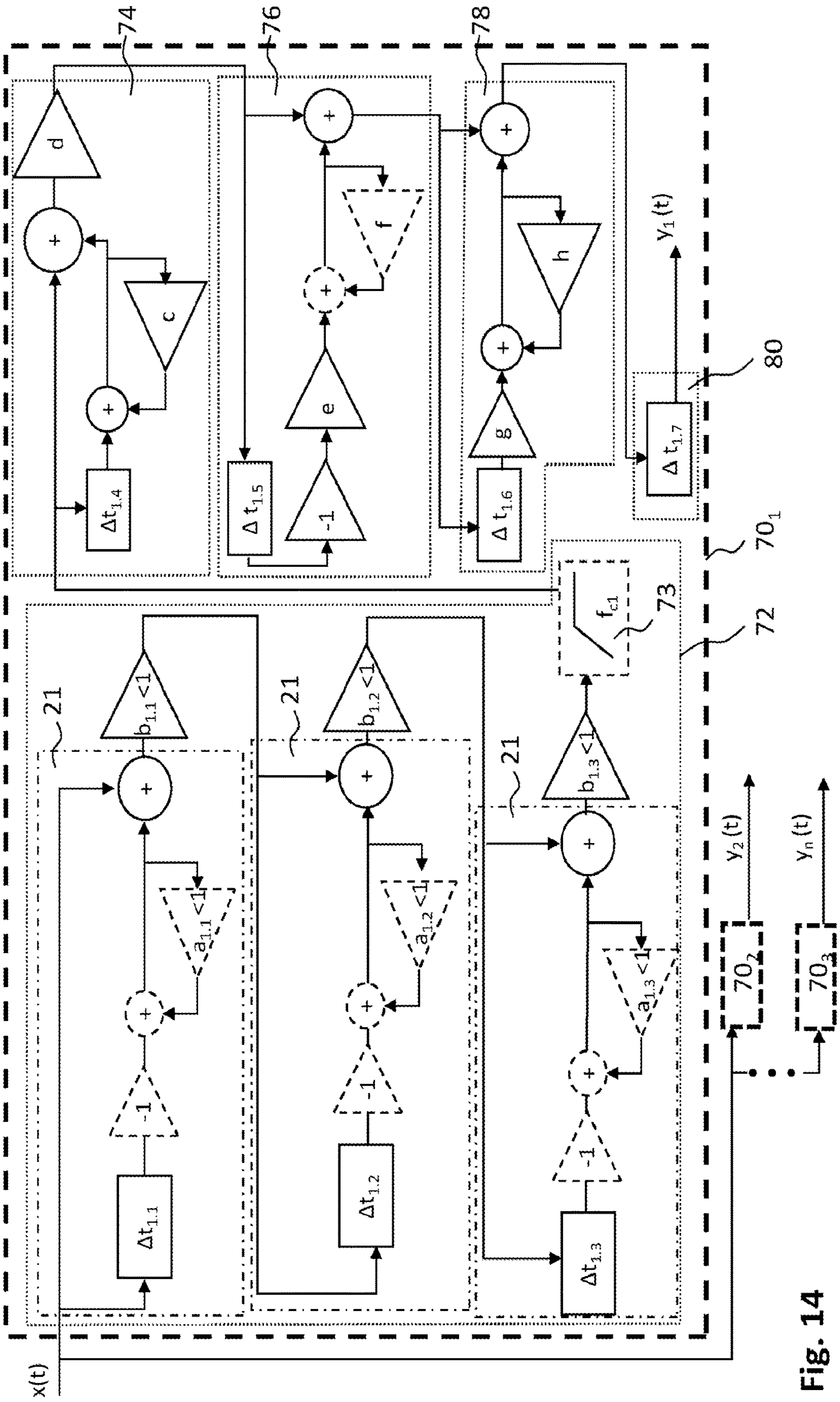
FIG. 14 illustrates the generation of an audio signal associated with a virtual sound source having a certain shape, positioned at a certain position.

It should be appreciated that the embodiments of FIG. 1 can be used as building blocks to build more complex embodiments, as for example shown in FIGS. 4, 7 and 14. Thus, although these more complex embodiments use as a building block the embodiment of FIG. 1A, any of the respective embodiments of FIGS. 1B-1J may be used as building blocks. In these complex embodiments, these building blocks, which may be any of the embodiments of FIGS. 1B-1J, are indicated by 21.

Figure 2:
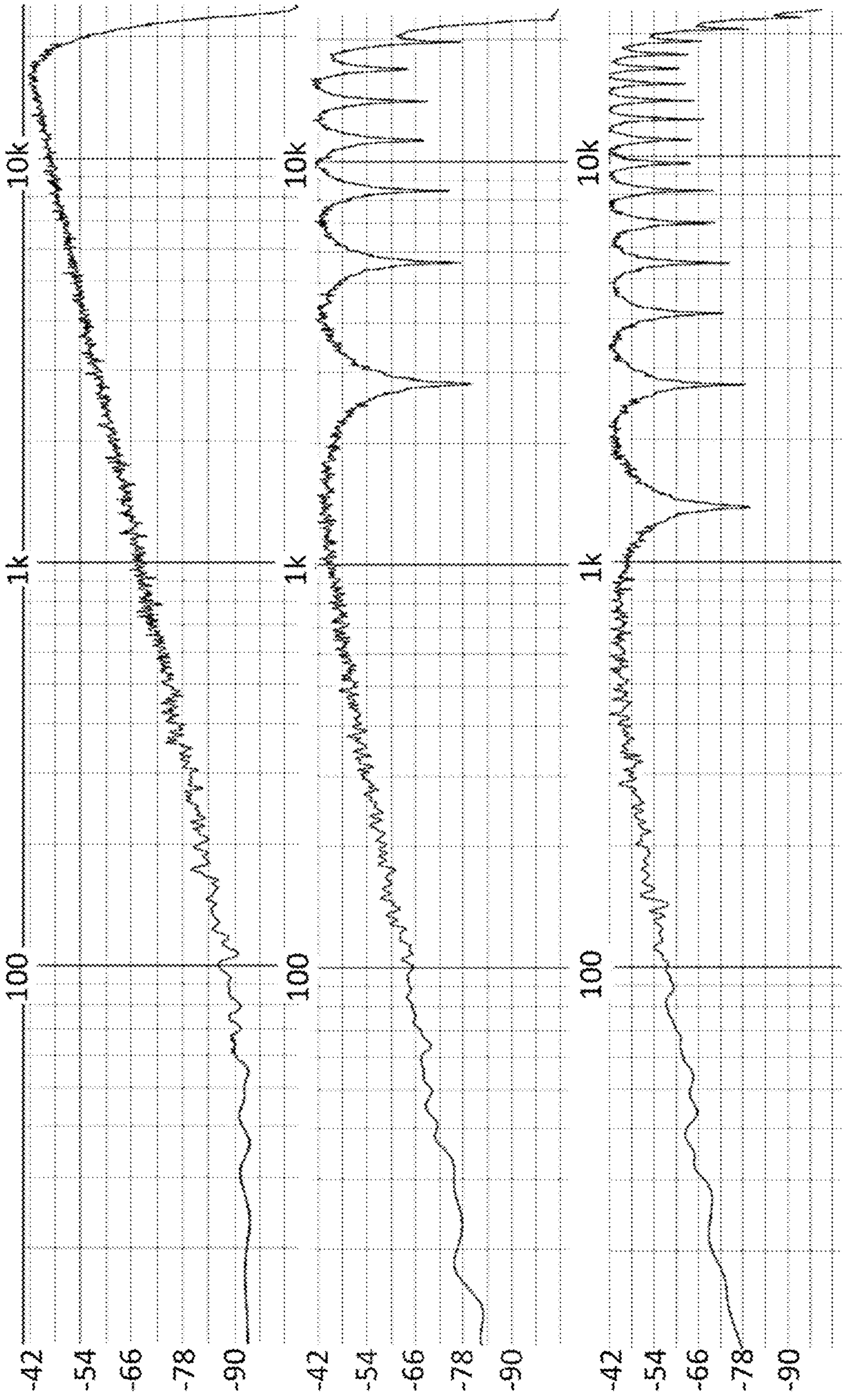
FIG. 2 shows spectrograms of audio signals generated using a method and/or system according to an embodiment.

FIG. 2 (top) shows the spectrogram of the generated audio signal when the input audio signal x(t) is white noise, the introduced time delay by the time delay operation 4 is ~0.00001 sec. the signal inverting operation 6 is performed and the signal feedback operation 10, 12 is not performed.

FIG. 2 (middle) shows the spectrogram of the generated audio signal when the input audio signal x(t) is white noise, the introduced time delay by the time delay operation 4 is ~0.00036 sec, the signal inverting operation 6 is performed and the signal feedback operation 10, 12 is not performed.

FIG. 2 (bottom) shows the spectrogram of the generated audio signal when the input audio signal x(t) is white noise, the introduced time delay by the time delay operation 4 is ~0.00073 sec, the signal inverting operation 6 is performed and the signal feedback operation 10, 12 is not performed.

These figures show that the spectrum of an audio signal can be modified precisely according to harmonic ratios, using a very simple operation.

Figure 3A:
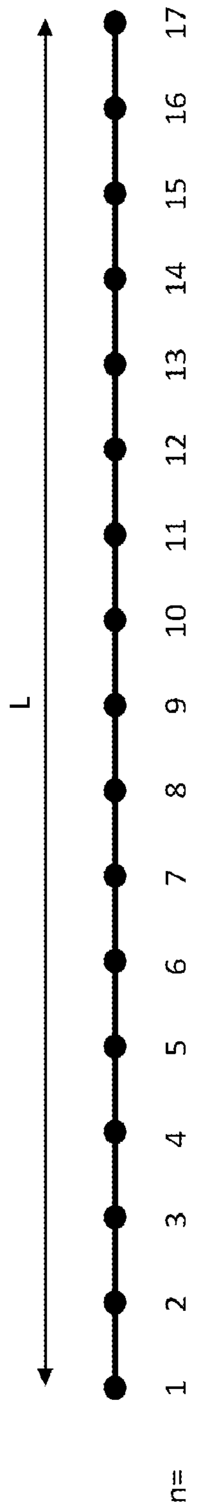
FIG. 3A shows an virtual sound source according to an embodiment, in particular a virtual sound source shape as a string.

FIG. 3A illustrates a virtual sound source in the form of a string. A number of virtual points n have been defined on the string's shape, in this example 17 virtual points. The points may be equidistant from each other as shown. The regular distance chosen between each two particles determines the resolution with which the virtual sound source is defined.

FIGS. 4 and 7 illustrate embodiments of the method and/or system that may be used to generate an audio signal that is perceived to originate from a sound source having a particular shape, e.g. the string shape as shown in FIG. 3A, the plate-shaped source or cubic source illustrated in FIG. 6. In these embodiments, the method comprises generating audio signal components $y_n(t)$ associated with respective virtual points on the virtual sound source's shape. Generating each audio signal component $y_0(t)$ comprises modifying the input audio signal to obtain a modified audio signal component using a signal delay operation introducing a time delay $\Delta t_n$. Then, each audio signal component $y_n(t)$ is generated based on a combination, e.g. a summation, of the input audio signal and its modified audio signal component. Preferably, the amplitude of each signal component resulting from said combination is attenuated, e.g. with −6 dB, by signal attenuating elements 19$_1$-19$_n$. At least two of the time delays that are introduced differ from each other. The audio signal components $y_n(t)$ together may be understood to constitute the generated audio signal y(t). In an example, the audio signal components are combined to generate the audio signal. However, in another example, these audio signal components are individually fed to a panning system that distributes each component individually to a plurality of loudspeakers. When the audio signal components are played back simultaneously through an audio output medium. e.g. through one or more loudspeakers, the resulting audio signal will be perceived by an observer as originating from a sound source having the particular shape.

FIG. 4 in particular illustrates an embodiment for generating an audio signal that is perceived to originate from a sound source that is shaped as a string. e.g. the string shown in FIG. 3A. Thus, referring to FIG. 3A, generated audio signal component $y_1(t)$ is associated with point n=1, audio signal component $y_2(t)$ with point n=2, et cetera. In this embodiment, each modification to the input audio signal not only comprises the introduction of a time delay $\Delta t_n$, but also inverting the audio input signal as indicated by signal inverting operations 16$_1$-16$_n$, in order to obtain a modified audio signal component. The modified audio signal components are inverted with respect to the input audio signal, in the case of a sounding object that cannot freely vibrate on its edges, such as is the case with a string under tension, or the skin of a drum. In case of a sounding object that freely vibrates on all its edges, none of the modified audio signal components are inverted, and preferably a high-pass filter is added to the resulting signal component $y_n(t)$ to attenuate the low frequencies of the audio signal as will be explained with reference to FIG. 7.

Optionally, the modification also comprises a signal feedback operation 18$_1$-18$_n$, but this is not required for adding the dimensional information of the virtual sound source to the audio signal. The depicted embodiment shows that each audio signal component $y_n(t)$ may be the result of a summation of the input audio signal x(t) and the inverted, time-delayed input audio signal. While FIG. 4 shows that the time delay operation is performed prior to the signal inverting operation 16, this may be the other way around.

For a string shaped virtual sound source of 1 meter long, the time differences for 17 equidistant positioned virtual points on the string may be as follows:

| n | Δt (s) |
|---|---|
| 1 | 0.00000 |
| 2 | 0.00036 |
| 3 | 0.00073 |
| 4 | 0.00109 |
| 5 | 0.00146 |
| 6 | 0.00182 |
| 7 | 0.00219 |
| 8 | 0.00255 |
| 9 | 0.00292 |
| 10 | 0.00255 |
| 11 | 0.00219 |
| 12 | 0.00182 |
| 13 | 0.00146 |
| 14 | 0.00109 |

-continued

| n | Δt (s) |
| --- | --- |
| 15 | 0.00073 |
| 16 | 0.00036 |
| 17 | 0.00000 |

These values for the introduced time delays are in accordance with $\Delta t_n = Lx_n/v$, wherein L indicates the length of the string, wherein $x_n$ denotes for virtual point n a multiplication factor and v relates to the speed of sound through a medium. For the values in the table, a value of 343 m/s was used, which is the velocity of sound waves moving through air at 20 degrees Celsius. A virtual point may be understood to be positioned on a line segment that runs from the center of the virtual sound source, e.g. the center of a string, plate or cube to an edge of the virtual sound source. As such, the virtual point may be understood to divide the line segment in two parts, namely a first part of the line segment that runs between an end of the virtual sound source and the virtual point and a second part of the line segment that runs between the virtual point and the center of the virtual sound source. The multiplication factor may be equal to the ratio between the length of the line segment's first part and the length of the line segment's second part. Accordingly, if the virtual point is positioned at an end of the sound source, the multiplication factor is zero and if the virtual point is positioned at the center of the virtual sound source, the multiplication factor is one. Thus, with these values, a user will perceive the generated audio signal as originating from a string-shaped sound source that is one meter in length, whereas the loudspeakers need not be spatially arranged in a particular manner.

In an embodiment, the method comprises obtaining shape data representing the virtual positions of the respective virtual points on the virtual sound source's shape and determining the time delays that are to be introduced by the respective time delay operations based on the virtual positions of the respective virtual points, preferably in accordance with the above described formula.

Figure 3B:
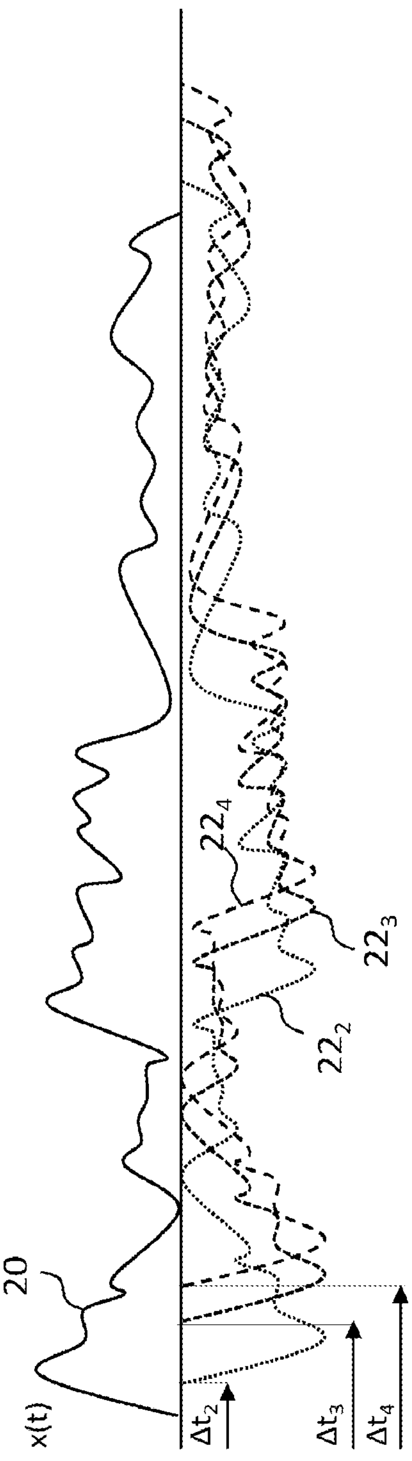
FIG. 3B schematically shows the input audio signal and signal inverted, time-delayed versions of the input audio signal that may be involved in embodiments.

FIG. 3B schematically shows modified audio signal components 22$_2$, 22$_3$ and 22$_4$ for points n=1, 2, 3 respectively. These audio signal components have been inverted with respect to the audio input signal 20 and time delayed by $\Delta t_2$, $\Delta t_3$, $\Delta t_4$ respectively.

Although FIG. 4 shows that the embodiment of FIG. 1A is used as building block 21, any of the embodiments shown in respective FIGS. 1A-1J may be used.

Figure 5:
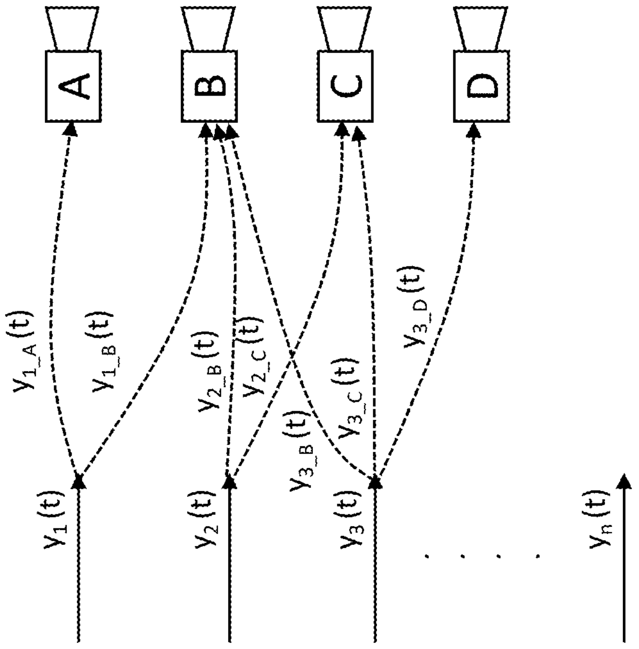
FIG. 5 illustrates a panning system that may be used in an embodiment.

FIG. 5 shows that the generated audio signal, or the generated audio signal components together forming the generated audio signal can be panned to one or more loudspeakers. This panning step may be performed using methods known in the art. In principle, with the method disclosed herein, the spatial information regarding dimensions, distance, height and depth of the virtual sound source can be added to an audio signal irrespective of the panning method and irrespective of how many loudspeakers are used to playback the audio signal.

In an embodiment, each of the generated audio signal components may in principle be fed to all loudspeakers that are present. However, depending on the panning method that is used, some of the audio signal components may be fed to a loudspeaker with zero amplification. Herewith, effectively, such loudspeaker does not receive such audio signal component. This is depicted in FIG. 5 for y1 in relation to loudspeaker C and D, for y2 in relation to loudspeakers A and D, and for y3 in relation to loudspeaker A. Typically, a panning system will provide the audio signal components to the loudspeakers with a discrete amplification of each audio signal component to each loudspeaker between zero and one.

Figure 6A:
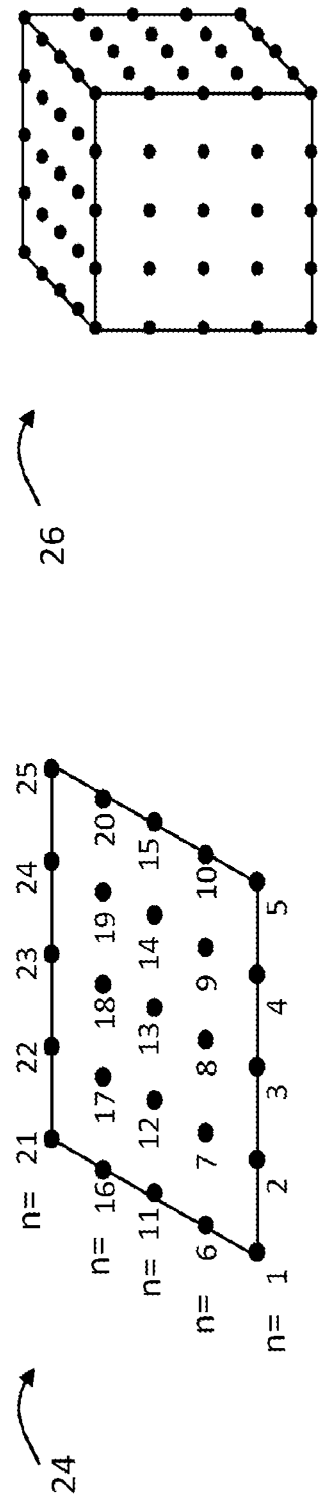
FIG. 6A illustrates two-dimensional and three-dimensional virtual sound sources.

FIG. 6A depicts further examples of virtual sound sources in order to illustrate that the method may be used for virtual sound sources having a more complex shape. The generated audio signal y(t) may for example be perceived as originating from a plate-shaped sound source 24 or a cubic-shaped sound source 26. Virtual points are defined onto the shape of the virtual sound source. A total of twenty-five virtual points have been defined on the plate shape of source 24 in the depicted example.

The virtual sound source may be shaped as a set of regular polygons; as well as shapes that are non-symmetrical, irregular or organically formed.

Figure 6B:
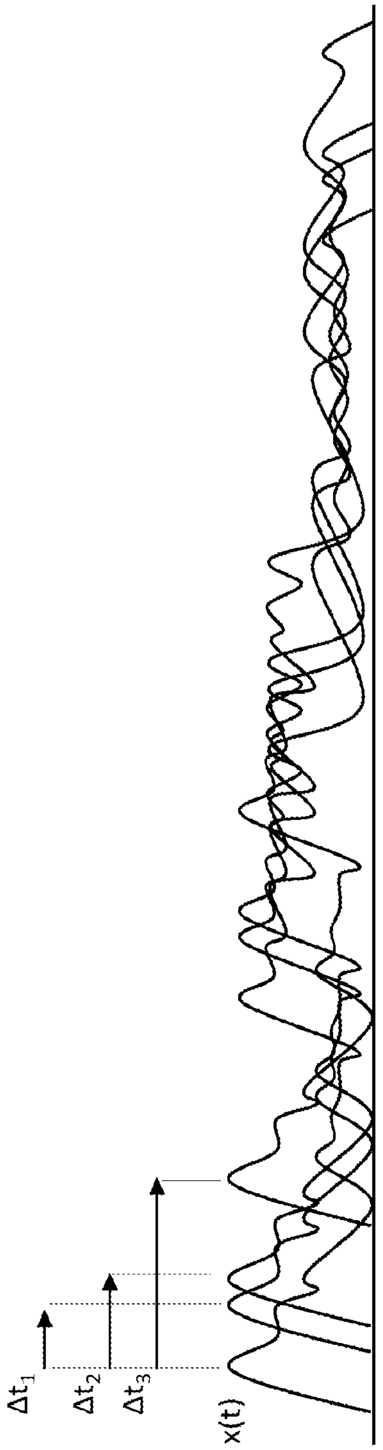
FIG. 6B shows an input signal and time-delayed version of this signal which may be involved in embodiments.

FIG. 6B illustrates a number of modified audio signal components that may be used when the virtual sound source has a two-dimensional or three-dimensional shape. The figure shows that all modified audio signal components may be time delayed, and none of the modified audio signal components are inverted with respect to the input audio signal, in accordance with a virtual sound source that freely vibrates on all its edges.

Figure 7A:
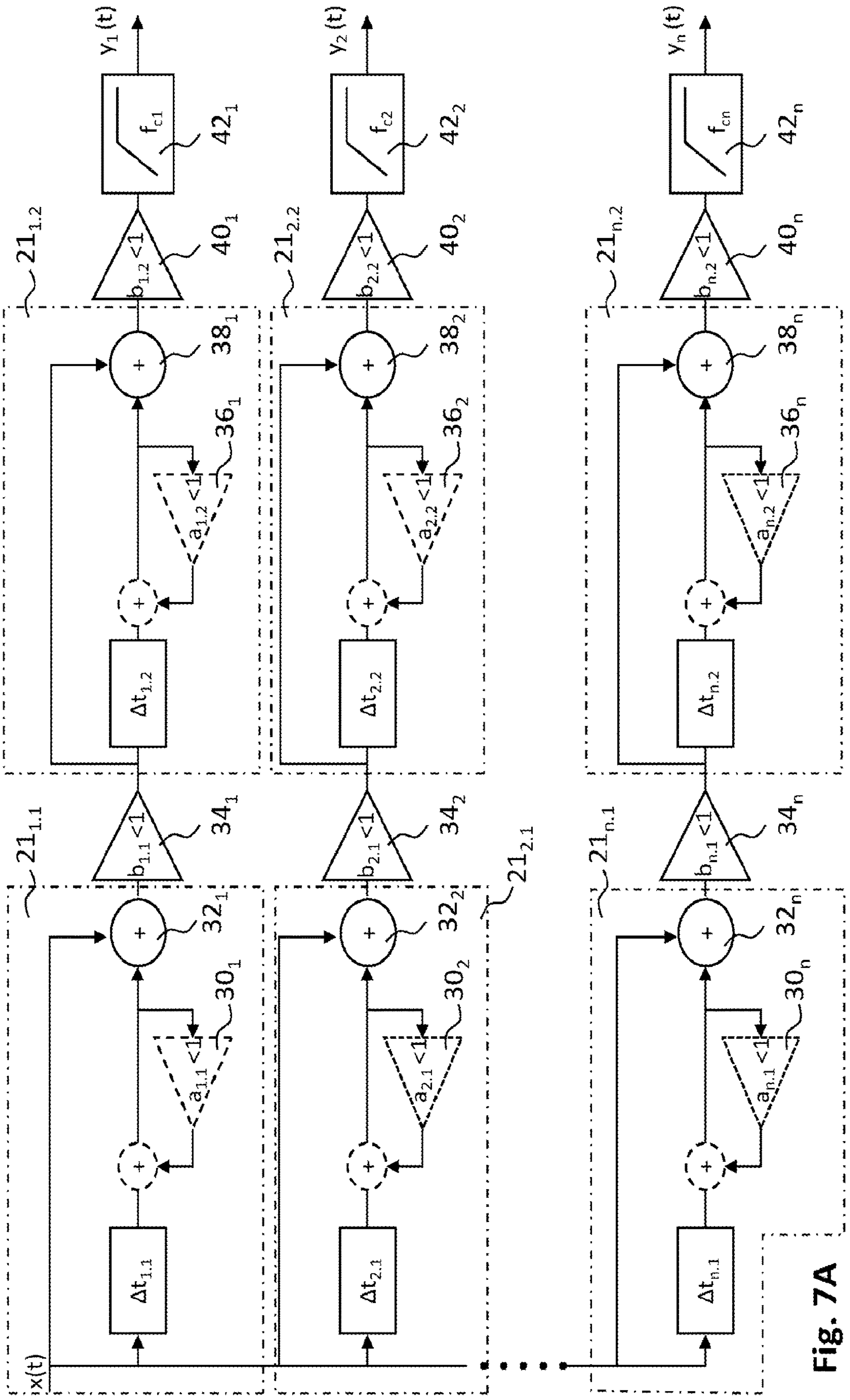
FIG. 7A illustrates a method for generating an audio signal associated with a two-dimensional virtual sound source, such as a plate.

FIG. 7A is a flowchart illustrating an embodiment in which the generated audio signal y(t) is perceived by an observer to originate from a sound source that is shaped as a plate. Again, a plurality of audio signal components $y_n(t)$ is determined respectively associated with virtual points that are defined on the shape. In this embodiment, each determination of an audio signal component $y_n(t)$ comprises modifying the input audio signal using a signal delay operation introducing a time delay $\Delta t_{n,1}$ optionally using a signal feedback operation 30 in order to obtain a modified audio signal component. Subsequently, a second modified audio signal component is generated based on a combination 32 of the input audio signal and the modified audio signal component. The second modified audio signal component may be attenuated, e.g. with approximately −6 dB (see attenuating elements 34). The second modified audio signal component may be modified using a signal delay operation $\Delta t_{n,2}$ introducing a second time delay and optionally a signal feedback operation 36 to obtain a third modified audio signal component. Then, the audio signal component $y_n(t)$ may be generated based on a combination 38 of the second and third modified audio signal component. Optionally, this step of generating the audio signal component $y_n(t)$ comprises performing an attenuation operation 40, e.g. with −6 dB, and/or a high pass filter operation 42 that applies a cut off frequency of $f_n$, which may be understood to attenuate frequencies below the lowest fundamental frequency occurring in the plate.

In this embodiment, determining an audio signal component comprises determining a first modified audio signal component and a third modified audio signal component. Determining the first resp. third modified audio signal component may comprise using a first resp. second time delay operation and a signal inverting operation and, optionally, a first resp. second signal feedback operation.

In this example, two combinations 32 and 38 are performed per audio signal component, however, for more complex shaped virtual sound sources, such as three dimensionally shaped sources, three or even more combination operations are performed per audio signal component. An example of this is shown in FIG. 14.

It should be appreciated that although FIG. 7A shows that two building blocks 21 are arranged in series for the generation of each $y_x(t)$ signal, also more than two, such as three, four, five, six or even more building blocks 21 can be arranged in series for the generation of each $y_x(t)$ signal.

Figure 7B:
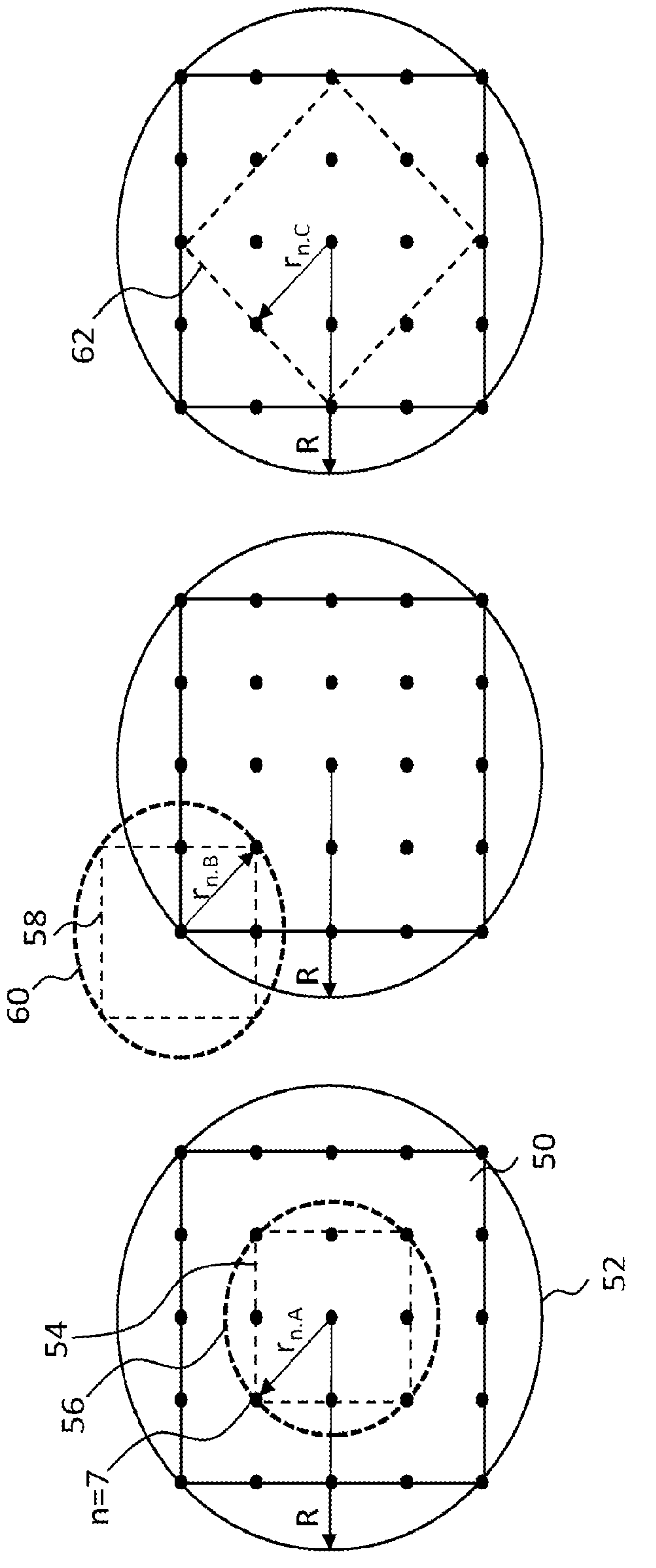
FIG. 7B schematically shows how several parameters may be determined that are used in an embodiment.

FIG. 7B illustrates how for each virtual point on a virtual sound source 50 that is shaped as a square plate, the associated time delays and cut-off frequency can be calculated. As an example. FIG. 7B illustrates how the time delays and cut-off frequency is calculated for point n=7 on the virtual sound source 50 shaped as a plate.

A first step comprises determining, for each virtual point, three values for the above mentioned multiplication factor x, viz. $x_A$, $x_B$, $x_C$ in accordance with the following formulas:

$$x_A = \left(1 - \frac{r_{n.A}^2}{R}\right)/3;$$

$$x_B = \frac{r_{n.B}^2}{R^2},$$

$$x_c = \left(1 - \frac{r_{n.C}}{R}\right)/6 \text{ for } \frac{r_{n.C}}{R} \leq 0.5;$$

$$x_c = \left(1 - \frac{r_{n.C}}{R}\right)/2 \text{ for } \frac{r_{n.C}}{R} > 0.5.$$

Herein R denotes the radius of a circle 52 passing through the vertices where two or more edges of the virtual sound source 50 meet. In this example, R is the radius of the circumscribed circle 52 of the square plate 50.

Further, $r_{n.A}$ denotes (see left illustration in FIG. 7B) the radius of a circle 56 passing through the vertices of a square 54, wherein the square 54 is a square having a mid point that coincides with the mid point of the virtual sound source 50 and has point n, point 7 in this example, at one of its sides. The sides of square 54 are parallel to the edges of the plate 50.

$r_{n.B}$ denotes (see middle illustration in FIG. 7B) the radius of a circle 60 passing through the vertices of a square 58, wherein the square 58 has a mid point that coincides with vertex that is nearest to point n and has sides that are parallel to the edges of the virtual plate sound source 50.

$r_{n.C}$ denotes (see right hand side illustration in FIG. 7B) the smallest distance between the mid point of the plate 50 and an edge of square 62, wherein square 62 has a mid point that coincides with the mid point of the virtual sound source 50 and has point n on one of its sides. Further, square 62 has a side that is perpendicular to at least one diagonal of the plate A. Since the virtual sound source in this example is square, square 62 is tilted 45 degrees with respect to the plate 50.

In a next step, the associated time delays $\Delta t_A$, $\Delta t_B$, $\Delta t_C$ are determined in accordance with $\Delta t = Ax/v$, wherein $\Delta t_B$ is only determined if $x_B$ is equal to or smaller than 0.25. Accordingly, for a square plate having 25 cm long edges and 25 virtual points as shown in FIGS. 6A and 7B, and v=500 m/s, the values for $x_A$, $x_B$, $x_C$ and $\Delta t_A$, $\Delta t_B$, $\Delta t_C$ are as follows.

| n | $x_A$ | $x_B$ | $x_C$ | $\Delta t_A$ (s) | $\Delta t_B$ (s) | $\Delta t_C$ (s) |
|---|---|---|---|---|---|---|
| 1 | 0 | 0 | 0 | 0 | 0 | 0 |
| 2 | 0 | 0.25 | 0.125 | 0 | 0.003125 | 0.00156 |
| 3 | 0 | 1 | 0.0833 | 0 | — | 0.00104 |
| 4 | 0 | 0.25 | 0.125 | 0 | 0.003125 | 0.00156 |
| 5 | 0 | 0 | 0 | 0 | 0 | 0 |
| 6 | 0 | 0.25 | 0.125 | 0 | 0.003125 | 0.00156 |
| 7 | 0.25 | 0.25 | 0.0833 | 0.003125 | 0.003125 | 0.00104 |
| 8 | 0.25 | 1 | 0.125 | 0.003125 | — | 0.00156 |
| 9 | 0.25 | 0.25 | 0.0833 | 0.003125 | 0.003125 | 0.00104 |
| 10 | 0 | 0.25 | 0.125 | 0 | 0.003125 | 0.00156 |
| 11 | 0 | 1 | 0.0833 | 0 | — | 0.00104 |
| 12 | 0.25 | 1 | 0.125 | 0.003125 | — | 0.00156 |
| 13 | 0.33 | 1 | 0.167 | 0.004167 | — | 0.00208 |
| 14 | 0.25 | 1 | 0.125 | 0.003125 | — | 0.00156 |
| 15 | 0 | 1 | 0.0833 | 0 | — | 0.00104 |
| 16 | 0 | 0.25 | 0.125 | 0 | 0.003125 | 0.00156 |
| 17 | 0.25 | 0.25 | 0.0833 | 0.003125 | 0.003125 | 0.00104 |
| 18 | 0.25 | 1 | 0.125 | 0.003125 | — | 0.00156 |
| 19 | 0.25 | 0.25 | 0.0833 | 0.003125 | 0.003125 | 0.00104 |
| 20 | 0 | 0.25 | 0.125 | 0 | 0.003125 | 0.00156 |
| 21 | 0 | 0 | 0 | 0 | 0 | 0 |
| 22 | 0 | 0.25 | 0.125 | 0 | 0.003125 | 0.00156 |
| 23 | 0 | 1 | 0.0833 | 0 | — | 0.00104 |
| 24 | 0 | 0.25 | 0.125 | 0 | 0.003125 | 0.00156 |
| 25 | 0 | 0 | 0 | 0 | 0 | 0 |

As shown, some values of $\Delta t_A$, $\Delta t_B$, $\Delta t_C$ are zero, or not determined because $x_B>0.25$. As a result, for each virtual point n, one or two different nonzero values are present for $\Delta t_A$, $\Delta t_B$, $\Delta t_C$. These values are then determined to be $\Delta t_1$ and $\Delta t_2$. (See below table).

The cut-off frequency for the high pass filter for each virtual point n may be determined as $$f_c = \frac{v}{A2(1 - r_{n.A}/R)} \text{ for } \frac{r_{n.A}}{R} \leq 0.5 \text{ and}$$

$$f_c = \frac{v}{A2(r_{n.A}/R)} \text{ for } \frac{r_{n.A}}{R} > 0.5.$$

Thus, for a virtual sound source having a plate shape with a total surface area A of 625 $cm^2$ which vibrates freely on its edges and is homogenous in its material structure, the following values for $\Delta t$ and $f_c$ may be used.

| n | $\Delta t_1$ (s) | $\Delta t_2$ (s) | $f_c$ (Hz) |
|---|---|---|---|
| 1 | 0 | 0 | 40 |
| 2 | 0.003125 | 0.00156 | 53.33 |
| 3 | 0.00104 | 0 | 80 |
| 4 | 0.003125 | 0.00156 | 53.33 |
| 5 | 0 | 0 | 40 |
| 6 | 0.003125 | 0.00156 | 53.33 |
| 7 | 0.003125 | 0.00104 | 80 |
| 8 | 0.003125 | 0.00156 | 53.33 |
| 9 | 0.003125 | 0.00104 | 80 |
| 10 | 0.003125 | 0.00156 | 53.33 |
| 11 | 0.00104 | 0 | 80 |
| 12 | 0.003125 | 0.00156 | 53.33 |
| 13 | 0.004167 | 0.00208 | 40 |
| 14 | 0.003125 | 0.00156 | 53.33 |
| 15 | 0.00104 | 0 | 80 |
| 16 | 0.003125 | 0.00156 | 53.33 |
| 17 | 0.003125 | 0.00104 | 80 |
| 18 | 0.003125 | 0.00156 | 53.33 |
| 19 | 0.003125 | 0.00104 | 80 |
| 20 | 0.003125 | 0.00156 | 53.33 |
| 21 | 0 | 0 | 40 |
| 22 | 0.003125 | 0.00156 | 53.33 |
| 23 | 0.00104 | 0 | 80 |
| 24 | 0.003125 | 0.00156 | 53.33 |
| 25 | 0 | 0 | 40 |

Thus, with these values, a user will perceive the generated audio signal as originating from a plate-shaped sound source of homogeneous substance and of particular size, whereas the loudspeakers need not be spatially arranged in a particular manner.

In an embodiment, the method comprises obtaining shape data representing the virtual positions of the respective virtual points on the virtual sound source's shape and determining the time delays that are to be introduced by the respective time delay operations based on the virtual positions of the respective virtual points. If the virtual sound source is shaped as a square plate, then the time delays may be determined using the formula described above.

Similarly as for 2D shapes, for a 3D shape two or more modified audio signal components are determined for some or each of the generated audio signal components $y_n(t)$ associated with virtual points that are defined on the shape. The values for the to be introduced time delays for each virtual point are in accordance with $\Delta t=Vx/v$, wherein V being the volume of the shape, wherein x denotes for virtual point n a multiplication factor according to the radial length $r_n$ from the centre and/or the edges of the shape to point n, and v relates to the speed of sound through a medium.

For each geometrical shape and/or different materials of heterogenous substance or material conditions, different variations of the algorithm may apply in accordance with the relationship between spatial dimensions of the shape and the time difference value at each virtual point.

For shapes that are not regular polygons and/or irregularly shaped, more than two or many modified audio signal components may be obtained for some or each of the generated audio signal components $y_n(t)$.

Figure 7C:
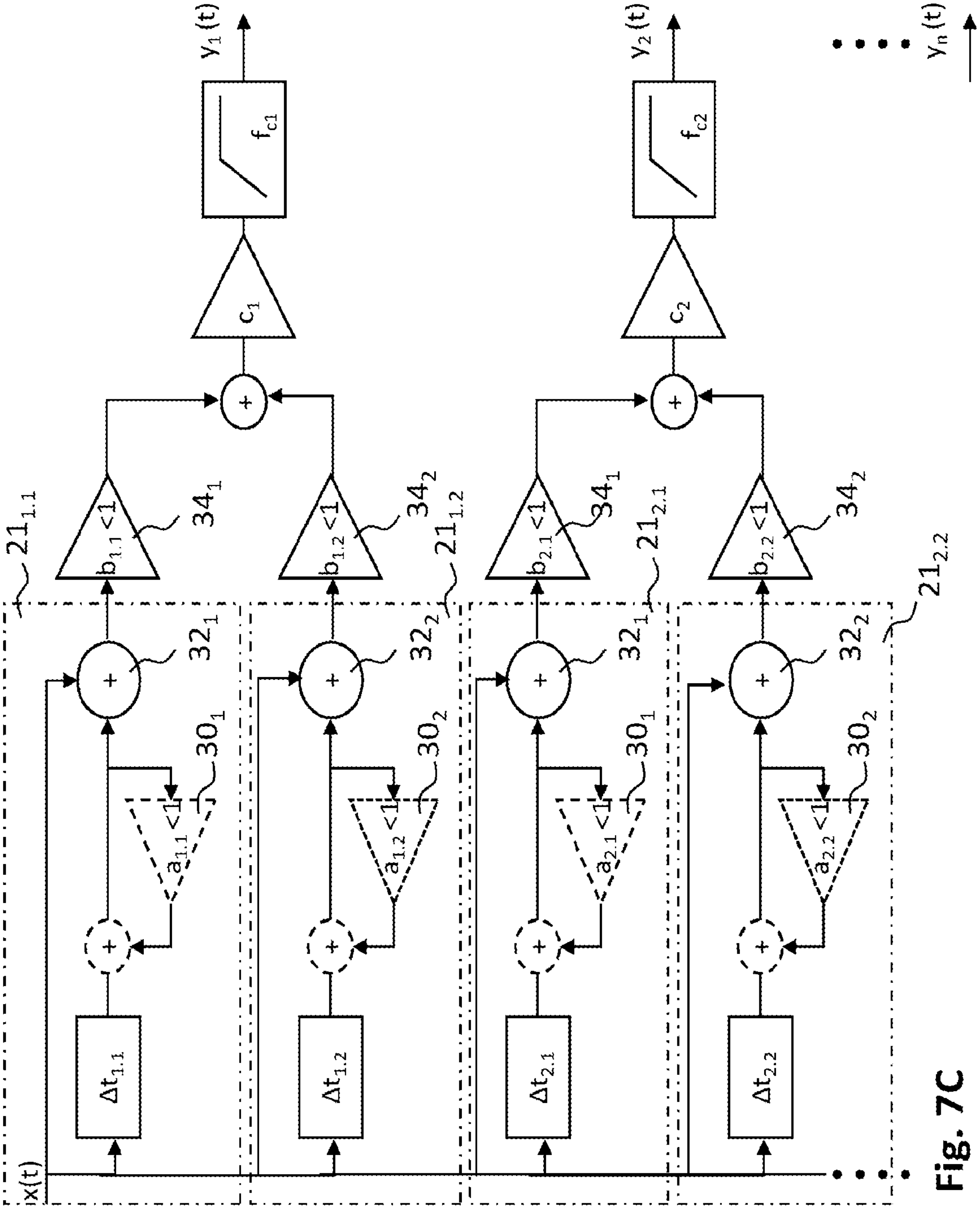
FIGS. 7C and 7D illustrate embodiments that are alternative to the embodiment of FIG. 7A.

FIG. 7C illustrates an embodiment that is alternative to the embodiment of FIG. 7A. Whereas the embodiment of FIG. 7A shows two building blocks 21 in series, the embodiment of FIG. 7C shows that two building blocks 21 can be arranged in parallel. The value $a_{x,x}$ in the embodiment of FIG. 7C is the same as value $a_{x,x}$ in the embodiment of FIG. 7A and the value of $b_{x,x}$ is the same as the value $b_{x,x}$ in the embodiment of FIG. 7A.

The embodiment of FIG. 7C is especially advantageous in that, for each signal component $y_1(t)$, the values of $b_{n.1}$ and $b_{n.2}$ can be controlled independently from each other.

It should be appreciated that although FIG. 7C shows that two building blocks 21 are arranged in parallel for the generation of each y t) signal, also more than two, such as three, four, five, six or even more building blocks 21 can be arranged in parallel for the generation of each $y_x(t)$ signal.

Figure 7D:
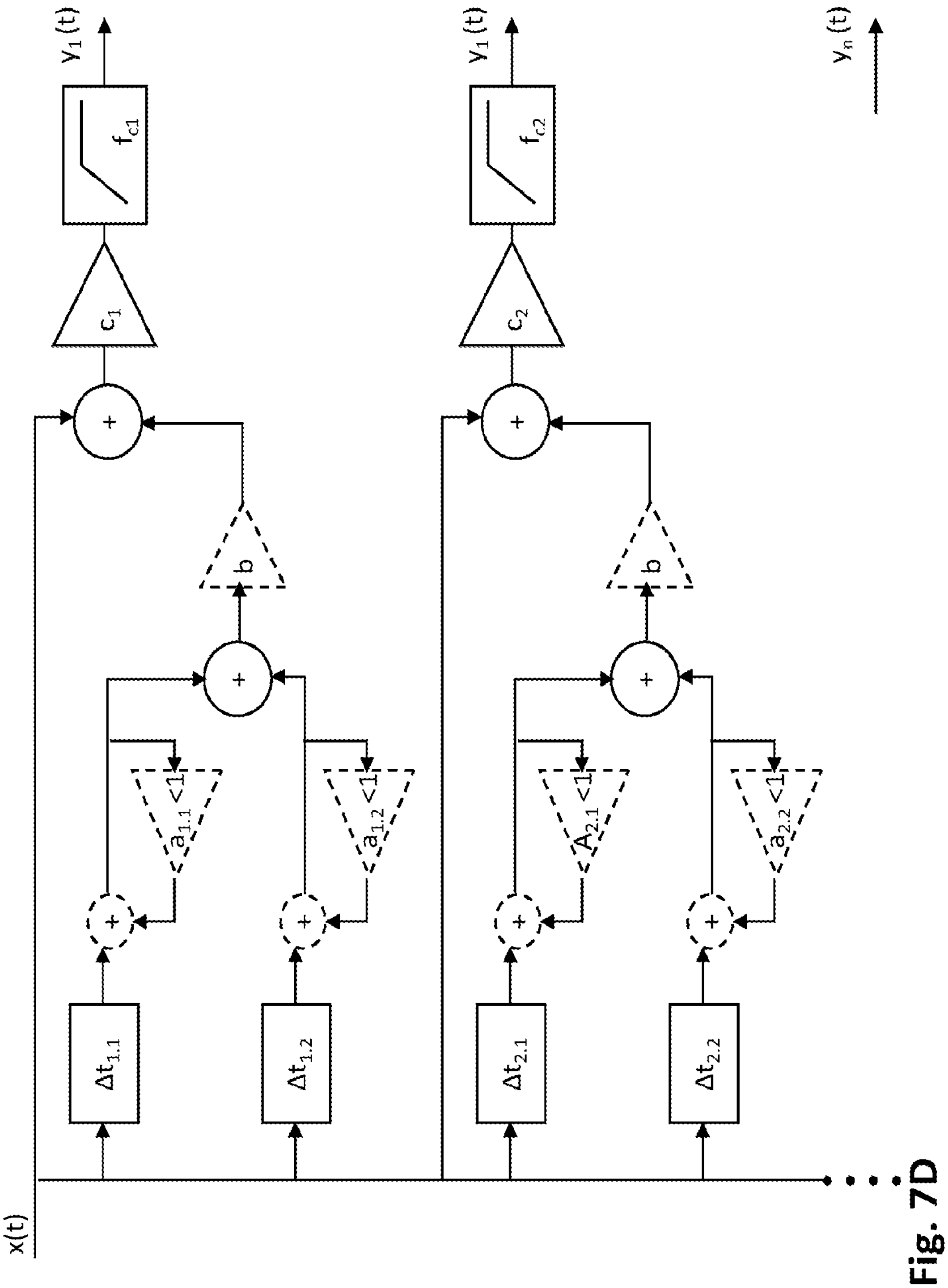

FIG. 7D illustrates an embodiment that is alternative to the embodiment of FIG. 7C. Whereas the embodiment of FIG. 7C shows that two building blocks 21 can be arranged in parallel. FIG. 7D shows that, instead of two whole building blocks, two or more modified audio signals, such as three, four, five, six or even more, can be generated from the audio input signal in parallel and then summed, optionally further modified with an attenuation operation, before being summed with the audio input signal in order to generate each signal $y_x(t)$. The value $a_{x,x}$ in the embodiment of FIG. 7D is the same as value $a_{x,x}$ in the embodiment of FIG. 7A and FIG. 7C. FIG. 7D is advantageous in that it enables a more efficient processing by reducing the amount of signal paths within the arrangement of the building blocks.

Figure 8A:
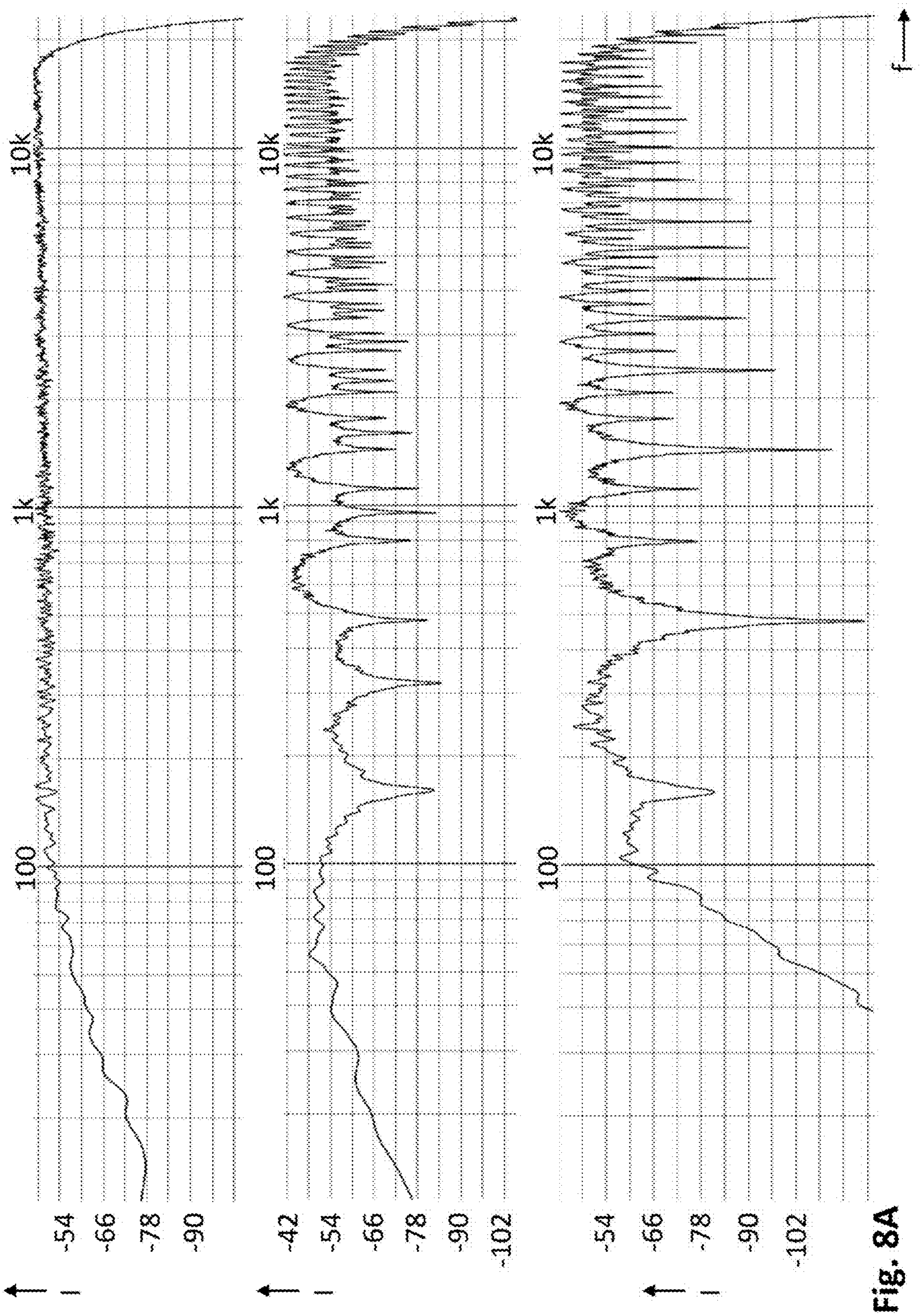
FIGS. 8A and 8B show spectrograms of respective audio signal components associated with respective virtual points on a virtual sound source.
Figure 8B:
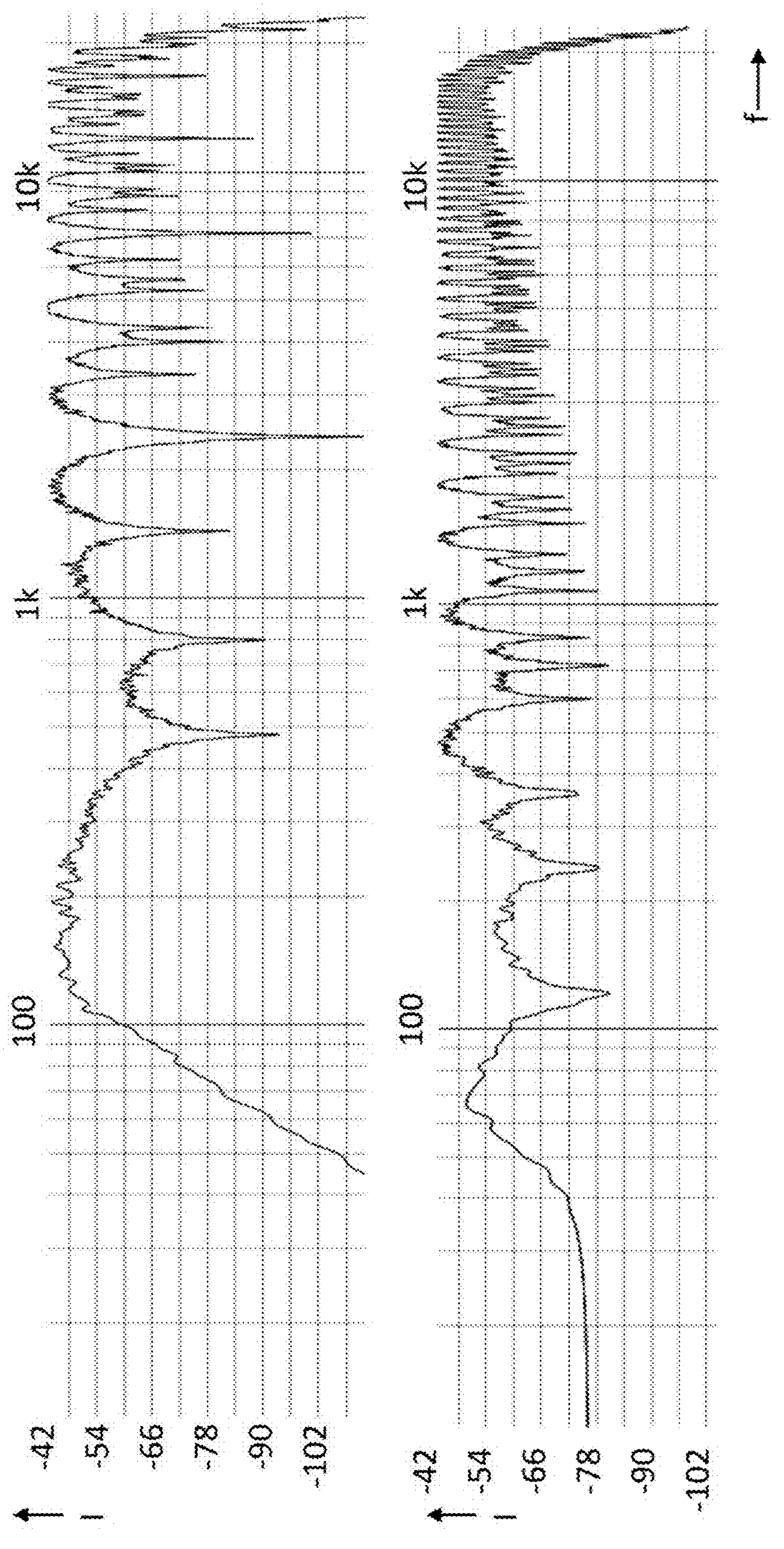

FIG. 8 shows (top) the spectrogram of the audio signal component $y_1(t)$ and (second from top) the spectrogram of the audio signal component $y_6(t)$ and (middle) the spectrogram of the audio signal component $y_7(t)$ and (second from bottom) the spectrogram of the audio signal component $y_{11}(t)$ and (bottom) the spectrogram of the audio signal component $y_{13}(t)$ indicated in FIG. 6A. The values for the time delays and the value of the frequency cut-off $f_c$ may be found in the above table.

Figure 9A:
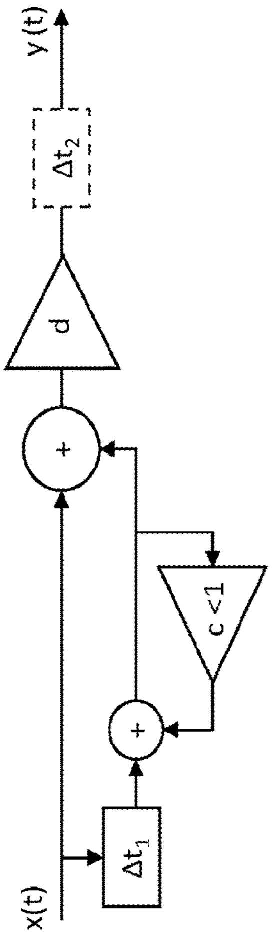
FIGS. 9A and 9B illustrate the generation of a virtual sound source that is positioned at a distance from an observer according to an embodiment.

FIG. 9A shows a flow chart according to an embodiment of the method wherein the generated audio signal will be perceived by an observer O as originating from a sound source S that is positioned at a distance, such as a horizontal distance away from him. The horizontal distance may be understood as the distance between the perceived virtual sound source and observer, wherein the virtual sound source is positioned in front of the observer.

In this embodiment, the input audio signal x(t) is modified using a time delay operation introducing a time delay and a signal feedback operation to obtain a first modified audio signal. Then, a second modified audio signal is generated based on a combination of the input audio signal x(t) and the first modified audio signal. The audio signal y(t) is generated by attenuating the second modified audio signal and optionally by performing a time delay operation as shown.

Preferably, the time delay that is introduced by the time delay operation performed for obtaining the first modified audio signal is as short as possible, e.g. shorter than 0.00007 seconds, preferably shorter than 0.00005 seconds, more preferably shorter than 0.00002 seconds. Most preferably, approximately 0.0001 seconds. In case of a digital sample rate of 96 kHz, the time delay may be 0.00001 seconds.

In dependence of the value of c together with value d, an observer will perceive different distances between himself and the virtual sound source. Herein, values in the triangles. i.e. in the attenuation or amplification operations may be understood to indicate a constant with which a signal is multiplied. Thus, if such value is larger than 1, then a signal amplification is performed. If such value is smaller than 1, then a signal attenuation is performed. When c=0 and d=1 no distance will be perceived and when c=1 and d=0 a maximum distance will be perceived corresponding a relative distance where the sound source has become imperceptible, and thus the output of the resulting sum audio signal will be 0 (−inf db). For performing the signal feedback operation to determine the first modified audio signal, the value for d may relate to the value for c as d=1−cx where the value for x is a multiplication factor equal to or smaller than 1 applied to the amount of signal feedback that influences the steepness of a high-frequency dissipation curve.

In an example, the method comprises obtaining distance data representing the distance of the virtual sound source. Then, the input audio signal is attenuated in dependence of the distance of the virtual sound source in order to obtain the modified audio signal.

The optional time delay indicated by $\Delta t_2$ can create a Doppler effect associated with movement of the virtual sound source. $\Delta t_2$ may be determined as $\Delta t_2=L/v$, wherein L is a distance between the sound source S and the observer O and v is the speed of sound through a medium.

Figure 9B:
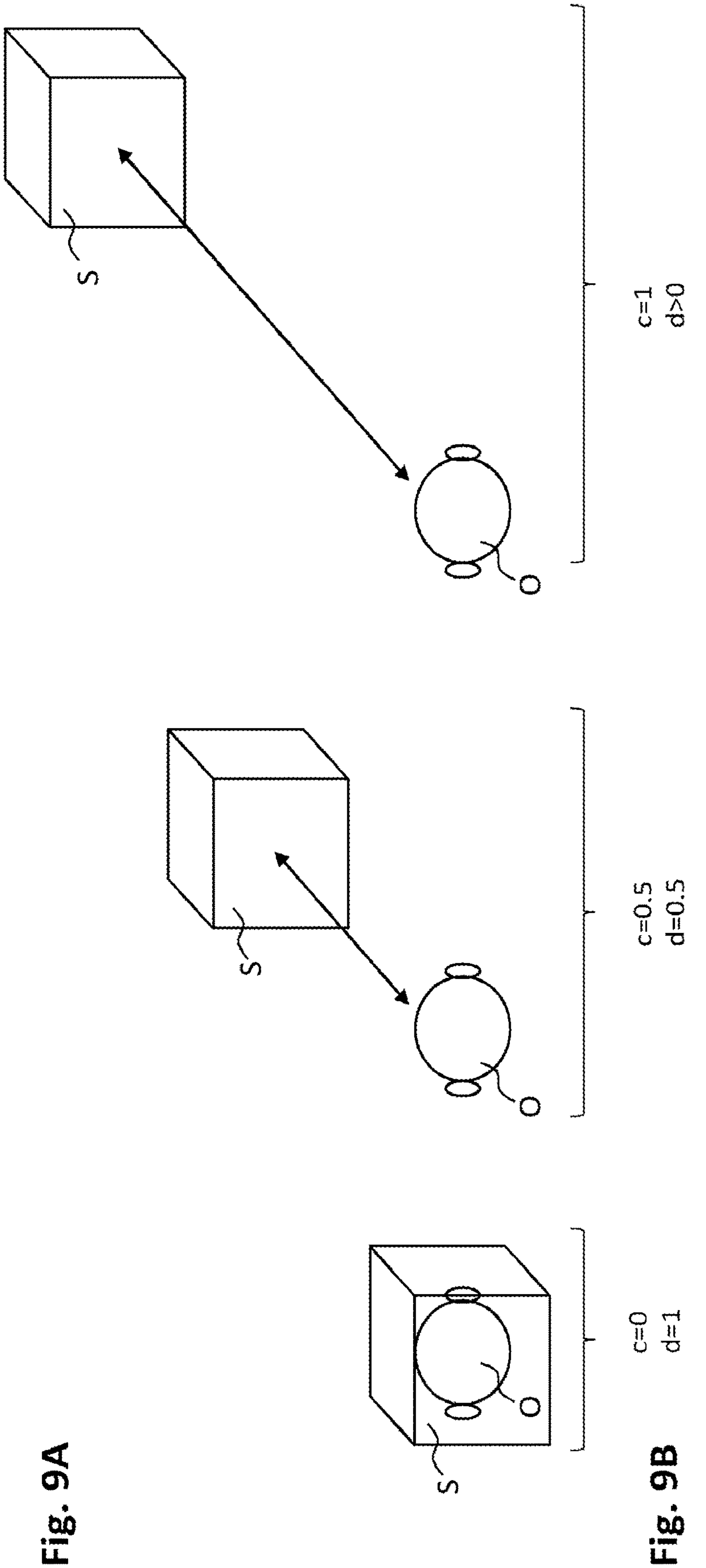
Figure 9C:
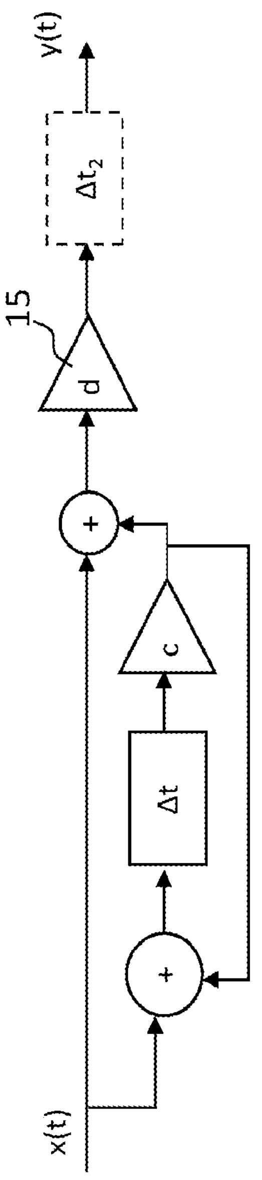
FIGS. 9C-9E show alternative embodiments to the embodiment of FIG. 9A.

FIGS. 9C. 9D and 9E illustrate alternative embodiments to the embodiment of FIG. 9A. Herein, the values for c, d and for the introduced time delay are the same as shown in FIG. 9B.

FIG. 9C differs from the embodiment shown in FIG. 9A in that the signal delay operation is performed in the signal feedback operation.

Figure 9D:
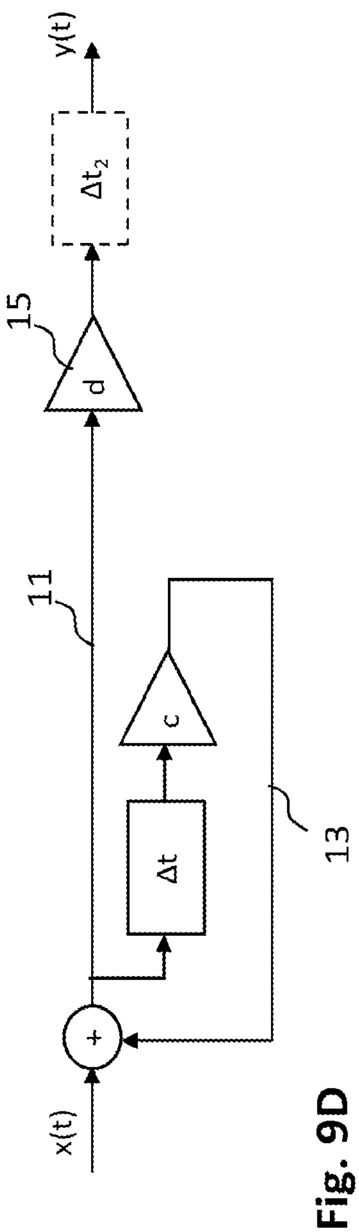

FIG. 9D illustrates an embodiment that comprises modifying the input audio signal to obtain a first modified audio signal 11 using a signal feedback operation that recursively adds a modified version 13 of the input audio signal to itself, wherein the feedback operation comprises a signal delay operation introducing a time delay. In this embodiment, the audio signal y(t) is generated based on the first modified audio signal 11, this step comprising a signal attenuation 15 and optionally a time delay operation introducing a second time delay.

Figure 9E:
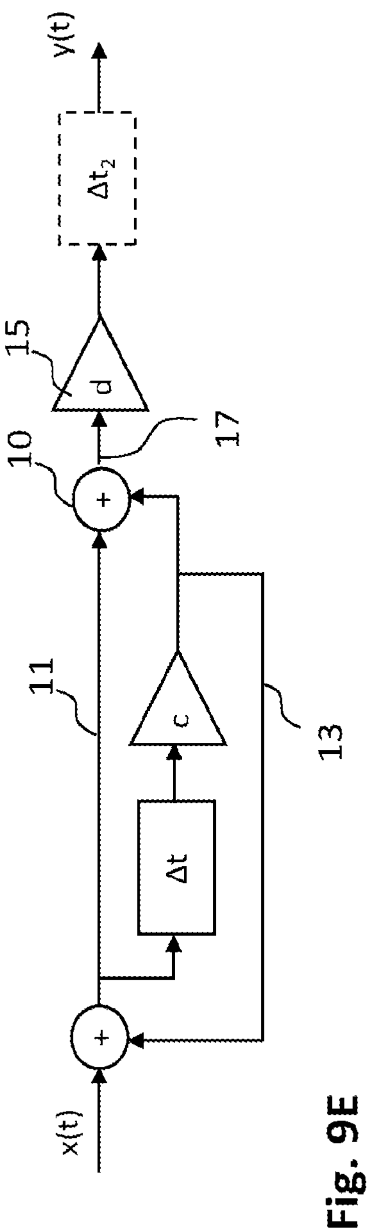

FIG. 9E illustrates an embodiment that comprises generating a second modified audio signal 17 based on a combination 10 of the first modified audio signal 11 and a time-delayed version 13 of the first modified audio signal and generating the audio signal y(t) based on the second modified audio signal thus based on the first modified audio signal.

Figure 10:
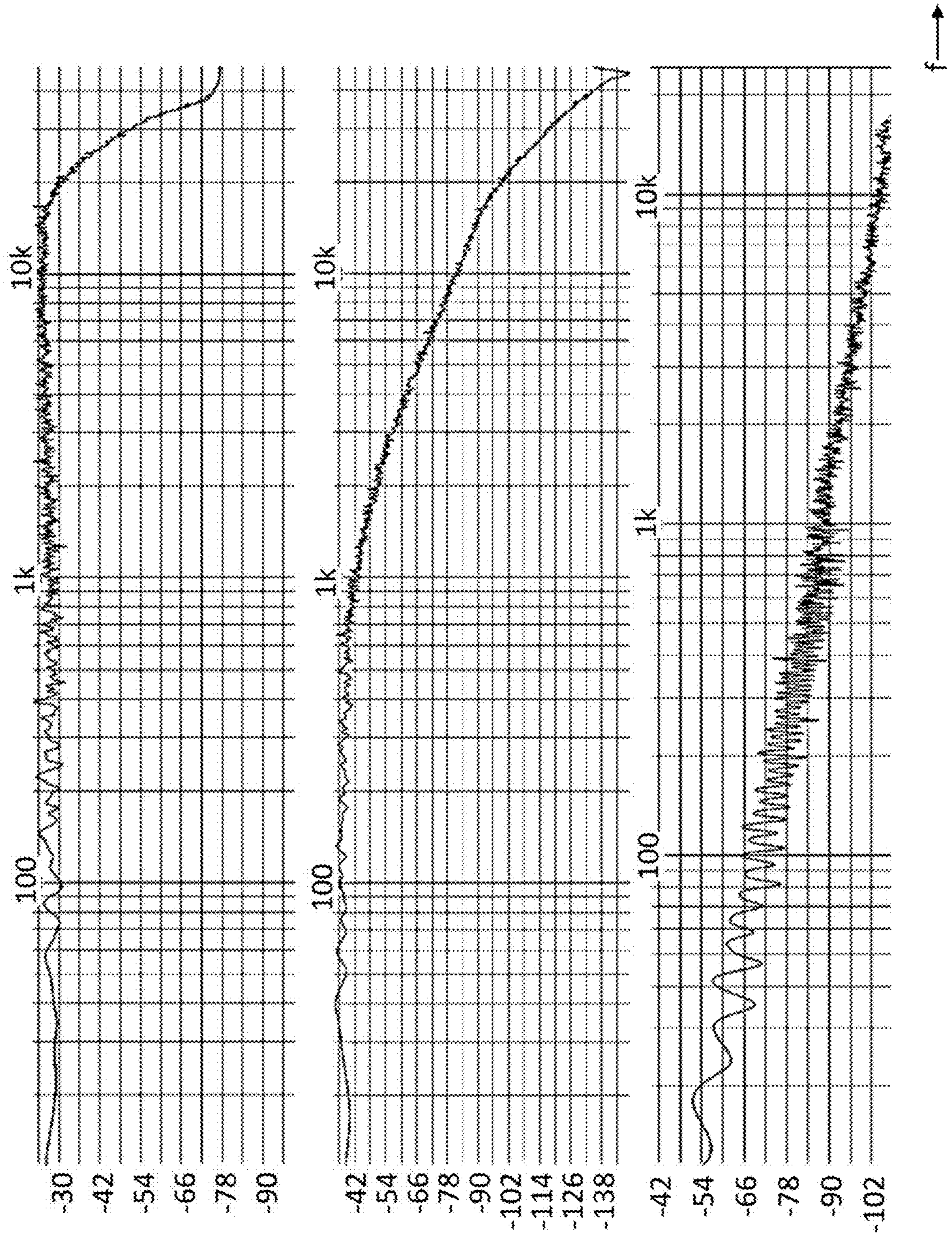
FIG. 10 shows spectrograms associated with a virtual sound source that is positioned at respective distances.

FIG. 10 (top) shows the spectrogram of sum audio signal after applying c=0, The input audio signal is white noise. Here, if c=0 then no modification is visible in the sum audio signal.

FIG. 10 (middle) shows the spectrogram of sum audio signal after applying c=0.5. The input audio signal is white noise. The observable result is a decrease of loudness of −12 db and a gradual damping of higher frequencies, as the perceived distance between the observer and the sound on length L increases. i.e. the higher frequencies of the sound dissipate proportionally faster than the lower frequencies. The curvature of the high-frequency dissipation will increase or decrease by varying the value x that is smaller than 1 and that multiplies the signal feedback amplitude.

FIG. 10 (bottom) shows the spectrogram of sum audio signal after applying c=0.99. The input audio signal is white noise. The overall loudness has decreased −32 db and the steepness of the high-frequency dissipation curve has increased, rendering the output audio signal close to inaudible, the perceived effect being as if the sound has dissipated in the distance almost entirely.

Figure 11A:
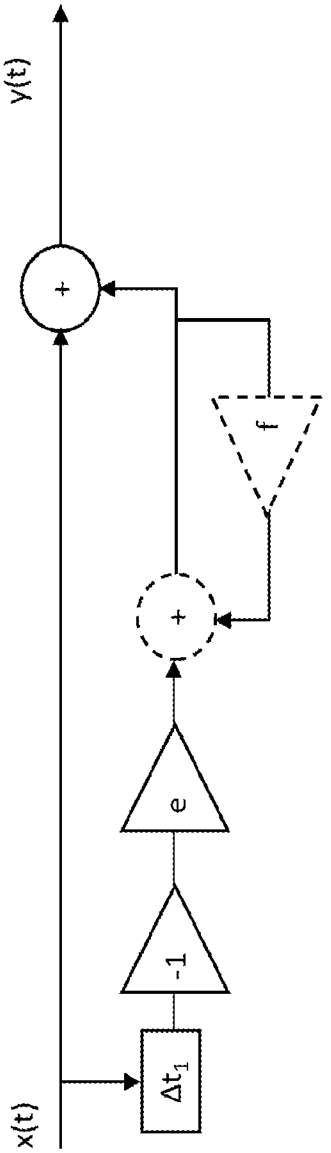
FIGS. 11A and 11B illustrate the generation of a virtual sound source that is positioned at a height above the observer according to an embodiment.
Figure 11B:
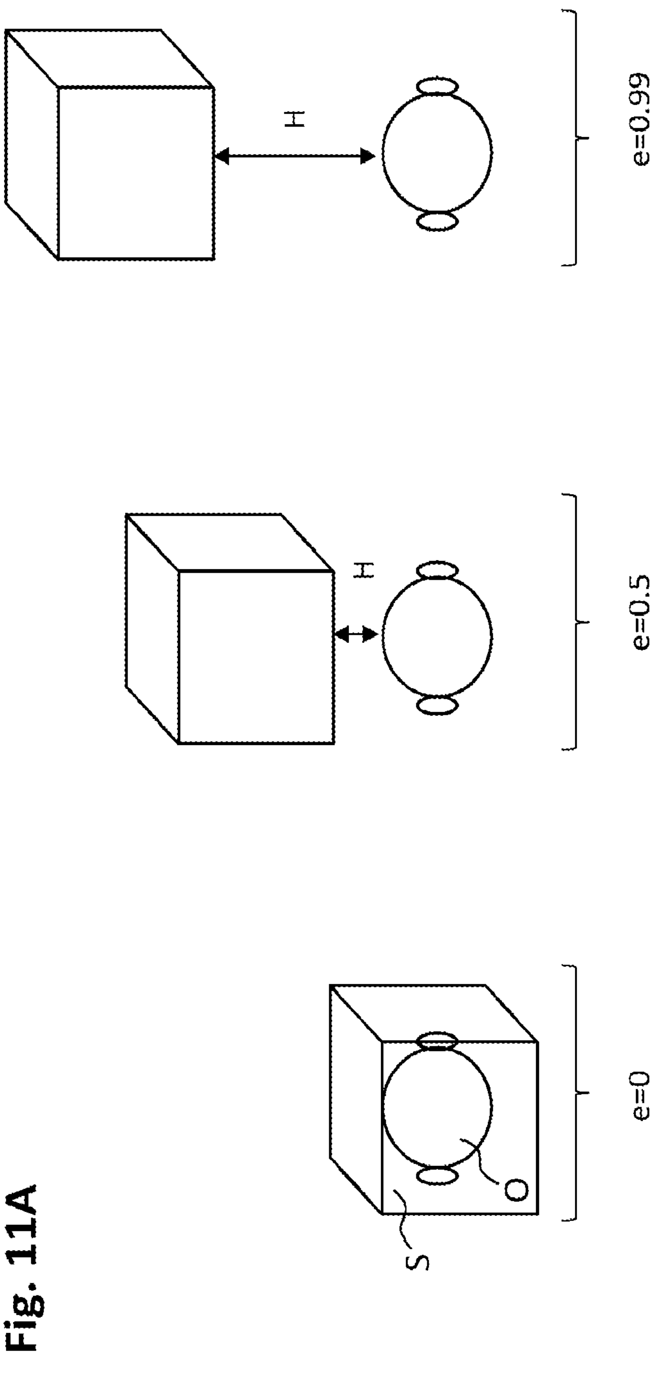

FIG. 11A shows a flow chart illustrating an embodiment of the method when the virtual sound source S is positioned at a virtual height H above an observer O (see FIG. 11B as well). Herein, the input audio signal x(t) is modified using a signal inverting operation, a signal attenuation operation and a time delay operation introducing a time delay in order to obtain a third modified audio signal. Then, the audio signal is generated based on a combination, e.g. summation, of the input audio signal and the third modified audio signal.

It should be appreciated that the signal delay operation, the signal inversion operation and the signal attenuation operation may be performed in any order.

The input audio signal x(t) may be attenuated in dependence of the height to obtain the third modified audio signal, preferably such that the higher the virtual sound source is positioned above the observer, the lower the degree of attenuation is. This is shown in FIG. 11 in that the value for e increases with increasing height of the sound source S.

The introduced time delays as depicted in FIG. 11A are preferably as short as possible, e.g. shorter than 0.00007 seconds, preferably shorter than 0.00005 seconds, more preferably shorter than 0.00002 seconds. Most preferably in case of a digital sample rate of 96 kHz, the time delay may be 0.00001 seconds In case the virtual sound source is positioned above a listener modifying the input audio signal to obtain the third modified audio signal optionally comprises performing a signal feedback operation. In a particular example, this step comprises recursively adding an attenuated version of a signal, e.g. the signal resulting from the time delay operation, signal attenuation operation and signal inverting operation that are performed to eventually obtain the third modified audio signal, to itself. If the signal feedback operation is performed, value f may be equal to f=e*x where the value for x is a multiplication factor smaller than 1 applied to the amount of signal feedback that influences the steepness of a low-frequency dissipation curve. By varying value e, preferably between 0-1, a perception of height can be added to an audio signal, optionally with value f simultaneously. Herein, e=0 and f=0 correspond to no perceived height and e=1 and f<1 to a maximum perceived height, i.e. a distance above the observer where the sound source has become close to imperceptible.

Figure 12:
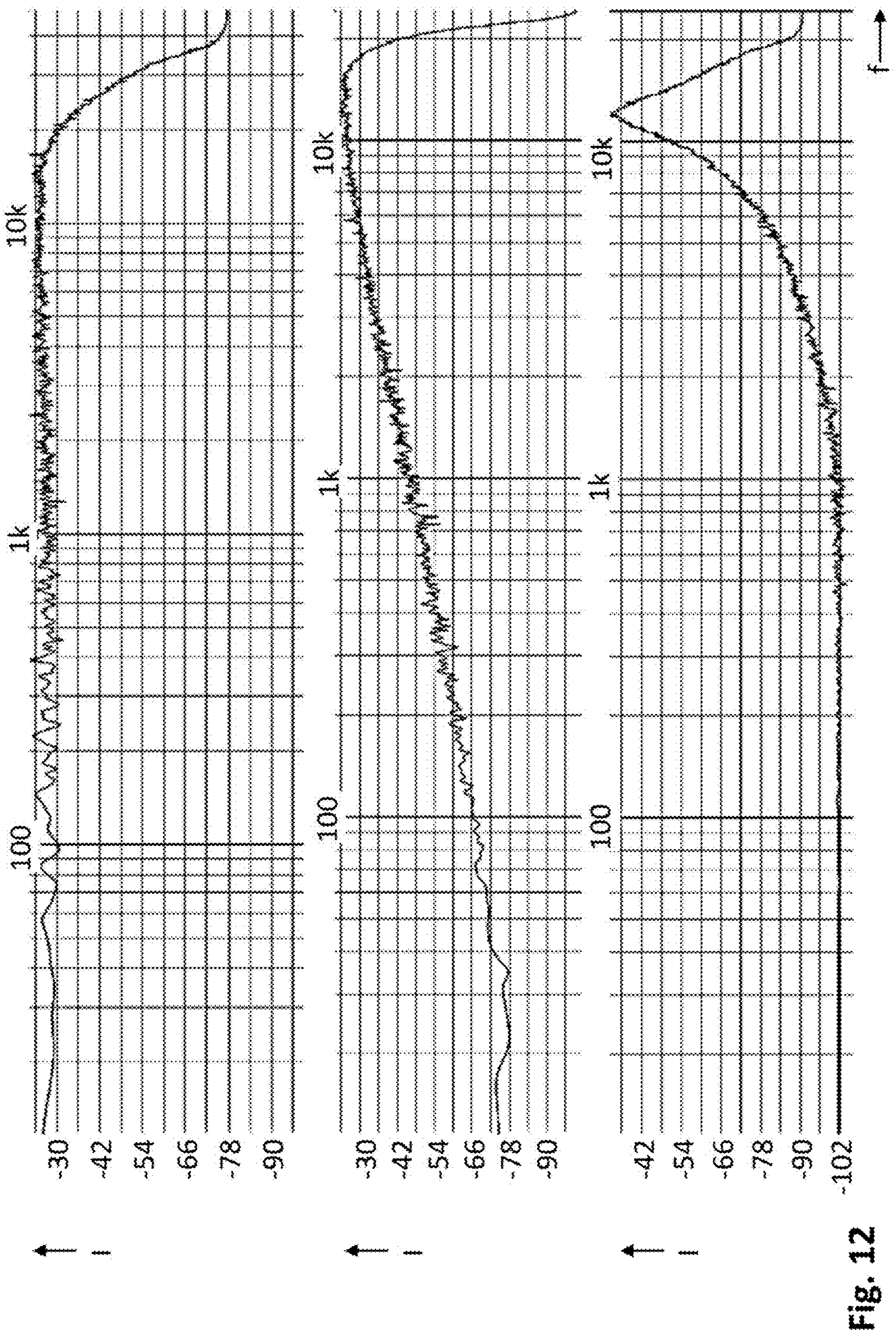
FIG. 12 shows spectrograms associated with a virtual sound source that is positioned at respective heights.

FIGS. 12A-12C depict the spectra of audio signals according to an embodiment of the invention.

FIG. 12A shows the spectrogram of sum audio signal after applying e=0. The input audio signal is white noise. Here, if e=0, then no modification is visible in the sum audio signal.

FIG. 12B shows the spectrogram of sum audio signal after applying e=0.5. The input audio signal is white noise. The observable result is a gradual damping of lower frequencies, as the perceived height H of the sound source S above the observer O increases. i.e. the lower frequencies of the sound dissipate with proportional increase of the value e. The steepness of the curve of the low-frequency dissipation increases or decreases by varying the value x that is smaller than 1 and that multiplies the signal feedback amplitude f.

FIG. 12C shows the spectrogram of sum audio signal after applying e=0.99. The input audio signal is white noise. The steepness of the high-frequency dissipation curve has increased, rendering the output audio signal close to inaudible for f<12 kHz, the perceived effect being as if the sound is at a far distance above the head of the perceiver.

Figure 13A:
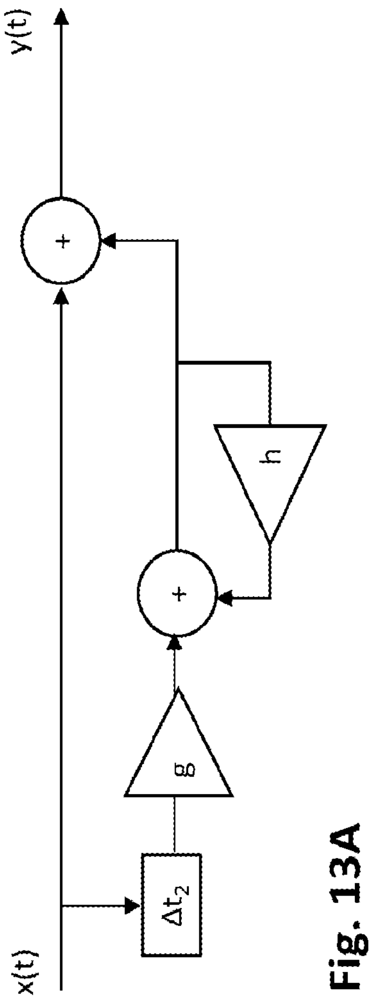
FIGS. 13A and 13B illustrate the generation of a virtual sound source that is positioned at a depth below the observer according to an embodiment.
Figure 13B:
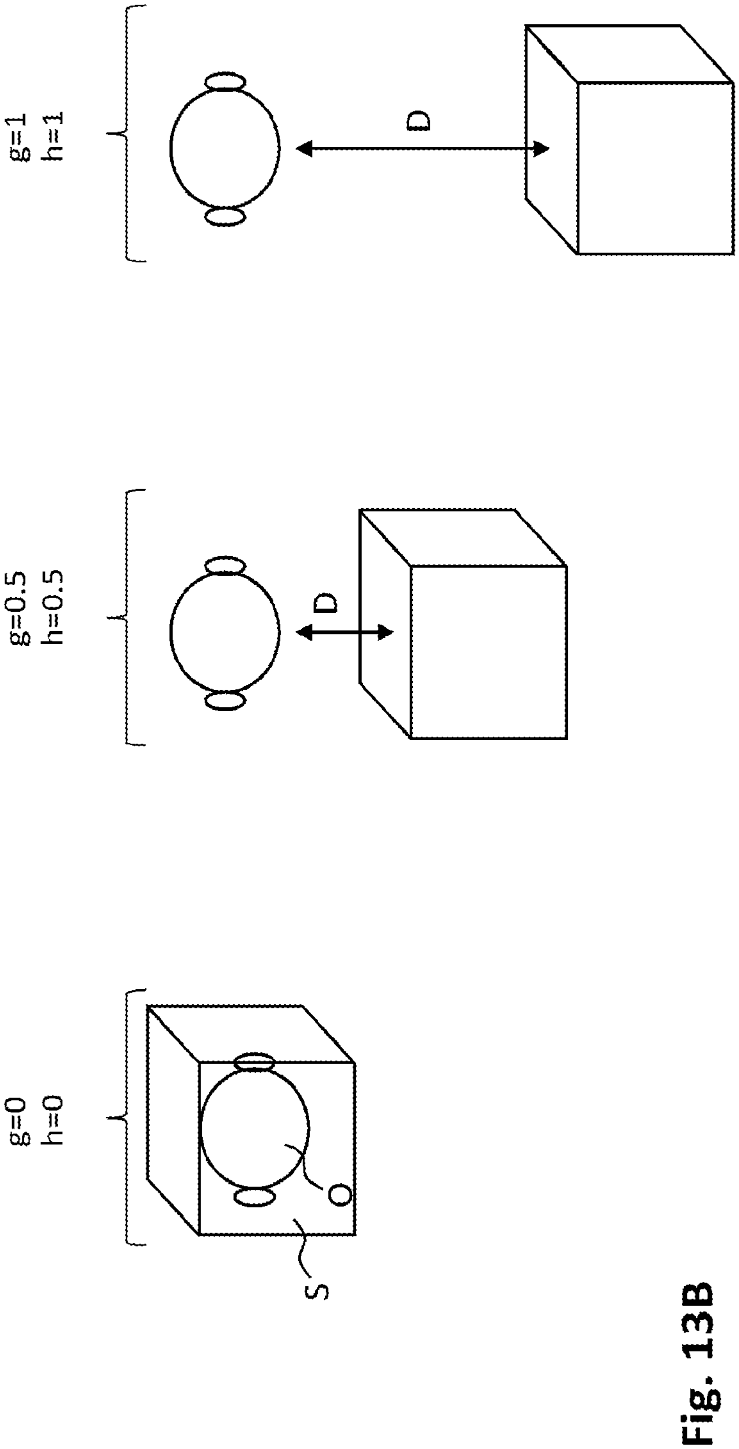

FIG. 13A shows a flow chart illustrating an embodiment of the method wherein the virtual sound source S is positioned at a virtual depth D below an observer O. (See FIG. 13B as well). This embodiment comprises modifying the input audio signal x(t) using a time delay operation introducing a time delay, a signal attenuation and a signal feedback operation in order to obtain a sixth modified audio signal. In the depicted embodiment, performing the signal feedback operation comprises recursively adding an attenuated version of a signal, e.g. the signal resulting from the time delay operation that is performed to eventually obtain the sixth modified audio signal, to itself. For the depicted embodiment this means that the value for h is nonzero. Preferably, the signal that is recursively added is attenuated in dependence of the depth below the observer. e.g. such that the lower the virtual sound source is positioned below the observer, the lower this attenuation is (corresponding to higher values for h in FIG. 13). The attenuation of the input audio signal before the feedback operation may be performed such that the lower the virtual sound source is positioned below the observer, the lower the attenuation (corresponding to higher values for g in FIG. 13). Then, the audio signal y(t) is generated based on a combination of the input audio signal and the sixth modified audio signal.

The introduced time delay as depicted in FIG. 13A is preferably as short as possible, e.g. shorter than 0.00007 seconds, preferably shorter than 0.00005 seconds, more preferably shorter than 0.00002 seconds. Most preferably in case of a digital sample rate of 96 kHz, the time delay may be 0.00001 seconds.

When g=0 and h=0 no depth will be perceived and when g=1 and h=1 a maximum depth will be perceived between the sound source S and the observer O. For performing the signal feedback operation to determine the third modified audio signal, the value for h may relate to the value for g as h=g*x where the value for x is a multiplication factor equal to or smaller than 1 applied to the amount of signal feedback, which influences the steepness of a high-frequency dissipation curve.

FIGS. 13C-13F show alternative embodiments to the embodiment of FIG. 13A wherein the virtual sound source is positioned at a virtual depth below an observer. The values of q and the time delay introduced by the signal delay operation may be the same as in FIG. 13A.

Figure 13C:
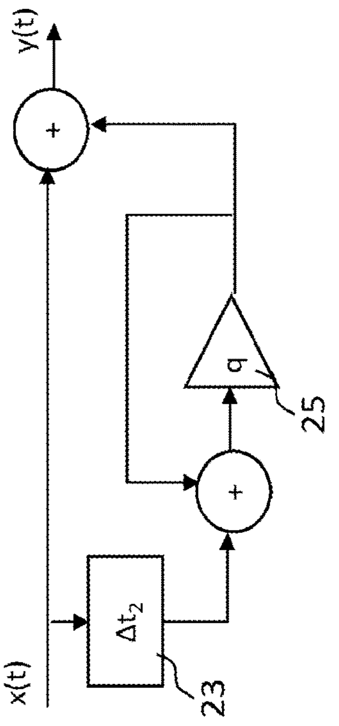
FIGS. 13C-13F show alternative embodiments to the embodiment of FIG. 13A.
Figure 13D:
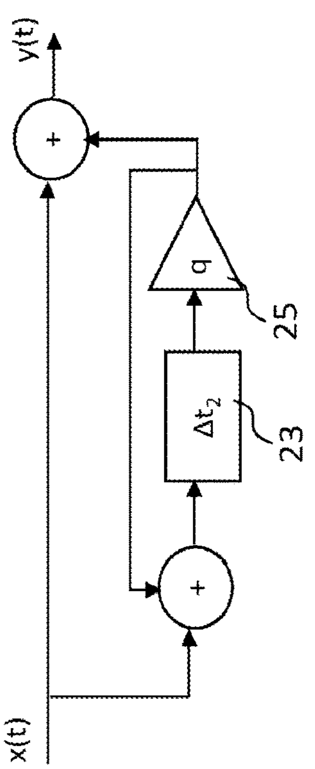

FIGS. 13C and 13D are other embodiments that each comprise modifying the input audio signal x(t) using a time delay operation 23 introducing a time delay, a first signal attenuation operation 25 and a signal feedback operation in order to obtain a modified audio signal and generating the audio signal based on a combination of the input audio signal and this modified audio signal. As can be readily seen, the embodiment of FIGS. 13C and FIG. 13D differ from the embodiment of FIG. 13A in that the signal delay operation and signal attenuation may or may not be performed in the signal feedback operation.

Figure 13E:
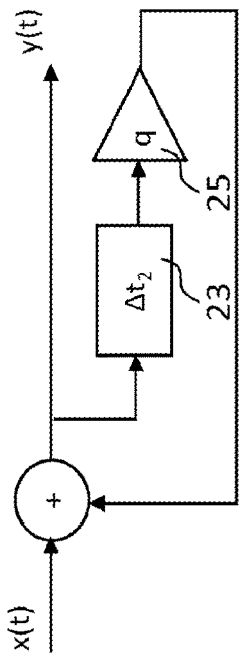

FIG. 13E shows an embodiment that comprises generating the audio signal y(t) using a signal feedback operation that recursively adds a modified version of the input audio signal to itself, wherein the feedback operation comprises a signal delay operation 23 introducing a time delay and a first signal attenuation operation 25.

Figure 13F:
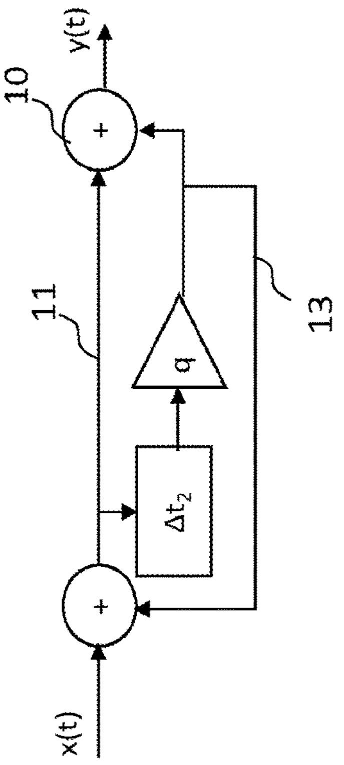

FIG. 13F shows an embodiment wherein a modified audio signal 11 is determined using a signal feedback operation and wherein the audio signal y(t) is determined based on a combination 10 of the modified audio signal and a time delayed, attenuated version of this modified audio signal.

FIG. 14 depicts a method and system for generating an audio signal according to an embodiment of the invention. In particular. FIG. 14 describes a complex flowchart of a spatial wave transform. Based on input signal x(t) several audio signal components $y_n(t)$ are determined, e.g. one for each virtual point on the virtual sound source's shape. Each audio signal component $y_n(t)$ is determined by performing steps that are indicated in the boxes $70_n$. Audio signal component $y_1(t)$ is determined by performing the steps as shown in box $70_1$. In each box $70_n$ similar steps may be performed, yet while using other valued parameters.

FIG. 14 in particular illustrates an example combination of several embodiments as described herein. Box 72 comprises the embodiment of FIG. 7A, however, may also comprise the embodiments of FIG. 7C or 7D. Box 74 comprises the embodiment as illustrated in FIG. 9A, however it should be appreciated that any of the embodiments 9C, 9D, 9E may be implemented in box 74. Box 76 comprises the embodiment as illustrated in FIG. 11A. Box 78 comprises the embodiment as illustrated in FIG. 13A, however any of the embodiments of respective FIGS. 13C, 13D, 13E and 13F may be implemented in box 78. Accordingly, the time delays that are introduced by the time delay operations of box 72 may be determined in accordance with methods described herein with reference to FIGS. 7A-7D. As described above, the signal inverting operations in box 72 may only be performed if the virtual sound source cannot freely vibrate on its edges. In such case, the high-pass filter 73 is inactive. If the virtual sound source can freely vibrate on its edges, the signal inverting operations in box 72 are not performed. In such case, preferably, the high-pass filter is active. The value for the cut-off frequency may be determined in accordance with methods described with reference to FIGS. 7A-7D. Further, the parameters c and d and the time delay in box 74 may be valued and/or varied and/or determined as described with reference to FIGS. 9A-9E. The parameters e and f may be valued and/or varied and/or determined as described with reference to FIGS. 11A and 11B. The parameters g and h may be valued and/or varied and/or determined as described with reference to FIGS. 13A-13F.

Further, it should be appreciated that building block 21 may be any of the building blocks depicted in FIGS. 1B-1J.

In the depicted embodiment, generating an audio signal component thus comprises adding dimensional information to the input audio signal, which may be performed by the steps indicated by box 72, adding distance information, which may be performed by steps indicated by box 74, and adding height information, which may be performed by steps indicated by box 76, or depth information, which may be performed by steps indicated by box 78. Further, a doppler effect may be added to the input audio signal, for example by adding an additional time delay as shown in box 80.

Preferably, because a virtual sound source is either positioned above or below an observer, only one of the modules 76 or 78 is performed. Module 76 can be set as inactive by setting e=0 and module 78 can be set inactive by setting g=0.

Figure 15:
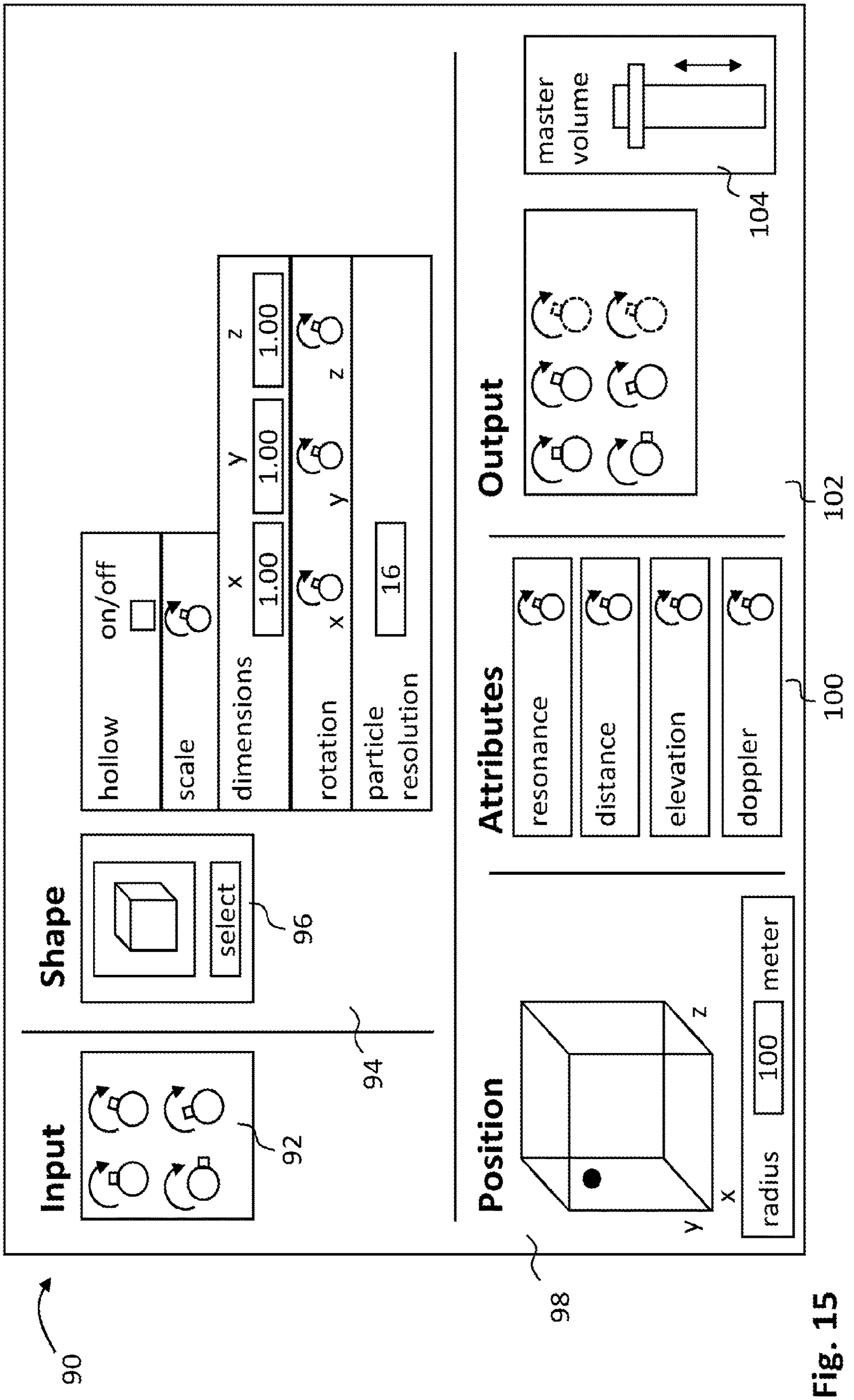
FIG. 15 illustrates a user interface according to an embodiment.

FIG. 15 depicts a user interface 90 according to an embodiment of the invention. An embodiment of the method comprises generating a user interface 90 as described herein. This user interface 90 enables a user to input the virtual sound source's shape.

- respective virtual positions of virtual points on the virtual sound source's shape.
- the distance between the virtual sound source and the observer,
- the height at which the virtual sound source is positioned above the observer,
- the depth at which the virtual sound source is positioned below the observer.

All functional operations of a spatial wave transform are translated to front-end user properties, i.e. audible manipulations of sound in a virtual space. The application of the invention is in no way limited to the lay-out and of this particular interface example and can be the subject of numerous approaches in system design and involve numerous levels of control for shaping and positioning sound sources in a virtual space, nor is it limited to any particular platform, medium or visual design and layout.

The depicted user interface 90 comprises an input module that enables a user to control the input audio signal of a chain using input receives. The input receives may comprise of multiple audio channels, either receiving from other chains or external audio sources, together combined as the audio input signal of a chain. The user interface enables a user to control the amplification of each input channel. e.g. by using gain knobs 92.

The user interface 90 may further comprise an output module that enables a user to route the summed audio output signal of the chain as an audio input signal to other chains.

The user interface 90 may further comprise a virtual sound source definition section 94 that enables a user to input parameters relating to the virtual sound source, such as its shape, e.g. by means of a drop-down menu 96, and/or whether the virtual sound source is hollow or solid and/or the scale of the virtual sound source and/or its dimensions, e.g. its Cartesian dimensions and/or a rotation and/or a resolution. The latter indicates how many virtual points are determined per unit of virtual surface area. This allows a user to control the amount of required calculations.

The input means for inputting parameters relating to rotation may be presented as endless rotational knobs for dimensions x, y and z.

The user interface 90 may further comprise a position section 98 that enables a user to input parameters relating to the position of the virtual sound source. the position of the shape in 3-dimensional space may be expressed in Cartesian coordinates +/−x, y, z wherein the virtual center of the space is denoted as 0,0,0; and which may be presented as a visual 3-dimensional field that one can place and move a virtual object within. This 3-dimensional control field may be scaled in size by adjusting the radius of the field.

The user interface 90 may further comprise an attributes section 100 that enables a user to control various parameters, such as the bandwidth and peak level of the resonance, perceived distance, perceived elevation, doppler effect.

The user interface 90 may further comprise an output section 102 that enables a user to control the output. For example, the discrete amplification of each audio signal component that is distributed to a configured amount of audio output channels may be controlled. The gain of each loudspeaker may be automatically controlled by i) the modelling of the virtual sound source's shape, ii) the rotation of the shape in 3-dimensional space and iii) the position of the shape in 3-dimensional space. The method for distribution of the audio signal components to the audio output channels may depend on the type of loudspeaker configuration and may be achieved by any such methods known in the art.

The output section 102 may comprise a master level fader 104.

The user input that is received through the user interface may be used to determine appropriate values for the parameters according to methods described herein.

Figure 16:
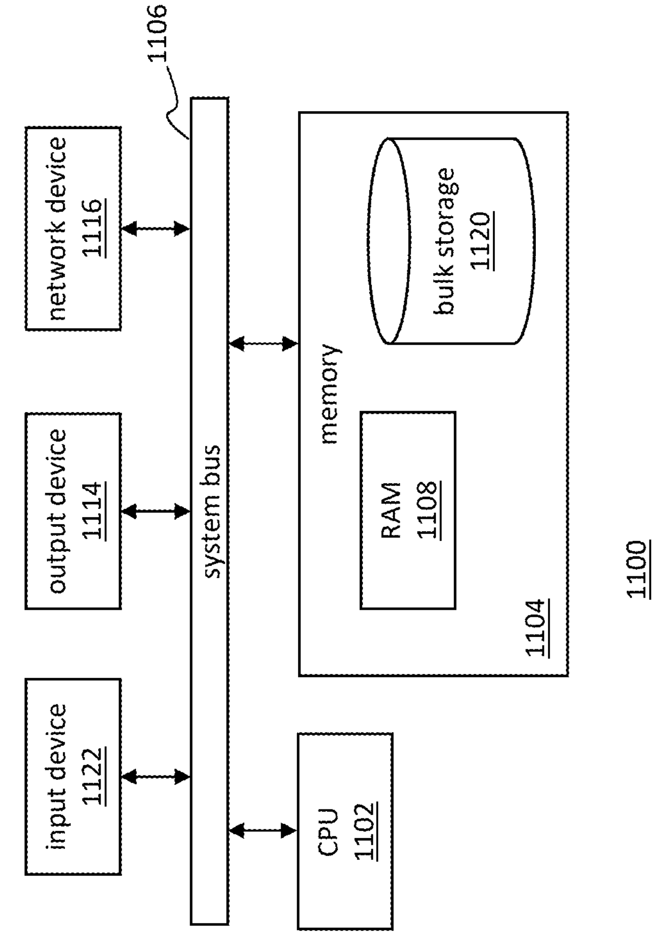
FIG. 16 illustrates a data processing system according to an embodiment.

FIG. 16 depicts a block diagram illustrating a data processing system according to an embodiment. As shown in FIG. 16, the data processing system 1100 may include at least one processor 1102 coupled to memory elements 1104 through a system bus 1106. As such, the data processing system may store program code within memory elements 1104. Further, the processor 1102 may execute the program code accessed from the memory elements 1104 via a system bus 1106. In one aspect, the data processing system may be implemented as a computer that is suitable for storing and/or executing program code. It should be appreciated, however, that the data processing system 1100 may be implemented in the form of any system including a processor and a memory that is capable of performing the functions described within this specification.

The memory elements 1104 may include one or more physical memory devices such as, for example, local memory 1108 and one or more bulk storage devices 1110. The local memory may refer to random access memory or other non-persistent memory device(s) generally used during actual execution of the program code. A bulk storage device may be implemented as a hard drive or other persistent data storage device. The processing system 1100 may also include one or more cache memories (not shown) that provide temporary storage of at least some program code in order to reduce the number of times program code must be retrieved from the bulk storage device 1110 during execution.

Input/output (I/O) devices depicted as an input device 1112 and an output device 1114 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 16 with a dashed line surrounding the input device 1112 and the output device 1114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1100, and a data transmitter for transmitting data from the data processing system 1100 to said systems, devices and/or networks. Modems, cable modems, and Ethernet cards are examples of different types of network adapter that may be used with the data processing system 1100.

As pictured in FIG. 16, the memory elements 1104 may store an application 1118. In various embodiments, the application 1118 may be stored in the local memory 1108, the one or more bulk storage devices 1110, or apart from the local memory and the bulk storage devices. It should be appreciated that the data processing system 1100 may further execute an operating system (not shown in FIG. 11) that can facilitate execution of the application 1118. The application 1118, being implemented in the form of executable program code, can be executed by the data processing system 1100, e.g., by the processor 1102. Responsive to executing the application, the data processing system 1100 may be configured to perform one or more operations or method steps described herein.

In one aspect of the present invention, the data processing system 1100 may represent an audio signal processing system.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 1102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A method for generating an audio signal y(t) associated with a virtual sound source, the virtual sound source having a virtual shape, the method comprising:

obtaining an input audio signal x(t):

defining a plurality of virtual points on the virtual shape of the virtual sound source;

generating audio signal components associated with the plurality of virtual points on the virtual shape of the virtual sound source, wherein said generating audio signal components comprises generating a first audio signal component associated with a first virtual point from the plurality of virtual points and generating a second audio signal component associated with a second virtual point from the plurality of virtual points; and generating the audio signal y(t) based on the first audio signal component and the second audio signal component, wherein:

generating the first audio signal component comprises:

modifying the input audio signal x(t) to obtain a modified first audio signal component using a first signal delay operation introducing a first time delay, the first time delay being based on a position of the first virtual point relative to the virtual shape and a speed of sound of a medium; and generating the first audio signal component based on a combination of the modified first audio signal component and at least one of:

the input audio signal x(t);

an inverted version of the input audio signal x(t);

an attenuated version of the input audio signal x(t); and an amplified version of the input audio signal x(t); or generating the first audio signal component comprises:

generating the first audio signal component based on a signal feedback operation that recursively adds a modified version of the input audio signal x(t) to itself, wherein the signal feedback operation comprises a signal inverting operation and a first signal delay operation introducing a first time delay, the first time delay being based on the position of the first virtual point relative to the virtual shape and the speed of sound of a medium; and wherein:

generating the second audio signal component comprises:

modifying the input audio signal x(t) to obtain a modified second audio signal component using a second signal delay operation introducing a second time delay different from the first time delay, the second time delay being based on a position of the second virtual point relative to the virtual shape and the speed of sound of the medium; and generating the second audio signal component based on a combination of the modified second audio signal component and at least one of:

the input audio signal x(t);

an inverted version of the input audio signal x(t);

an attenuated version of the input audio signal x(t); and an amplified version of the input audio signal x(t); or generating the second audio signal component comprises:

generating the second audio signal component using a feedback loop that recursively adds a modified version of the input audio signal x(t) to itself, wherein the feedback loop comprises a signal inverting operation and a second signal delay operation introducing a second time delay different from the first time delay, the second time delay being based on the position of the second virtual point relative to the virtual shape and a speed of sound of a medium.

2. The method according to claim 1, comprising obtaining shape data representing virtual positions of the respective virtual points on the virtual shape of the virtual sound source; and determining the first time delay based on the virtual position of the first virtual point and the second time delay based on the virtual position of the second virtual point.

3. The method according to claim 1, wherein the virtual sound source has a distance from an observer, the method comprising:

modifying the input audio signal x(t) using a third signal delay operation introducing a third time delay and a signal feedback operation to obtain a first modified audio signal;

generating a second modified audio signal based on a combination of the input audio signal x(t) and the first modified audio signal; and generating the audio signal y(t) based on the second modified audio signal, this step comprising attenuating the second modified audio signal.

4. The method according to claim 3, wherein the third time delay is shorter than 0.00007 seconds.

5. The method according to claim 3, comprising attenuating the second modified audio signal in dependence of distance of the virtual sound source.

6. The method according to claim 5, wherein:

the signal feedback operation comprises attenuating a signal, and recursively adding the attenuated signal to the signal itself; and the method further comprises controlling a degree of attenuation in the signal feedback operation and a degree of attenuation of the second modified audio signal in dependence of said distance, such that a larger the distance is, a lower the degree of attenuation in the signal feedback operation and a higher the degree of attenuation of the second modified audio signal.

7. The method according to claim 5, wherein:

modifying the input audio signal x(t) to obtain the first modified audio signal comprises a particular signal attenuation; and the method comprises controlling a degree of attenuation of the particular signal attenuation and the degree of attenuation of the second modified audio signal in dependence of said distance, such that a larger the distance is, a lower the degree of attenuation of the particular signal attenuation and a higher the degree of attenuation of the second modified audio signal.

8. The method according to claim 1, wherein the virtual sound source has a distance from an observer, the method comprising:

modifying the input audio signal x(t) to obtain a first modified audio signal using a signal feedback operation that recursively adds a modified version of the input audio signal x(t) to itself, wherein the signal feedback operation comprises a third signal delay operation introducing a third time delay; and generating the audio signal y(t) based on the first modified audio signal, this step comprising a signal attenuation.

9. The method according to claim 1, wherein the virtual sound source is positioned at a virtual height above an observer, the method comprising:

modifying the input audio signal x(t) using a signal inverting operation, a signal attenuation operation and a fourth signal delay operation introducing a fourth time delay in order to obtain a third modified audio signal; and generating the audio signal y(t) based on a combination of the input audio signal x(t) and the third modified audio signal.

10. The method according to claim 9, wherein modifying the input audio signal x(t) to obtain the third modified audio signal comprises performing a signal feedback operation.

11. The method according to claim 9, wherein said signal attenuation operation for obtaining the third modified audio signal is performed in dependence of the virtual height of the virtual sound source.

12. The method according to claim 11, wherein said signal attenuation operation is performed such that a higher the virtual sound source is positioned above the observer, a lower a degree of attenuation that is performed by said signal attenuation operation.

13. The method according to claim 9, wherein the fourth time delay that is introduced for obtaining the third modified audio signal is shorter than 0.00007 seconds.

14. The method according to claim 1, wherein the virtual sound source is positioned at a virtual depth below an observer, the method comprising:

modifying the input audio signal x(t) using a fifth signal delay operation introducing a fifth time delay, a first signal attenuation operation and a signal feedback operation in order to obtain a sixth modified audio signal; and generating the audio signal y(t) based on a combination of the input audio signal x(t) and the sixth modified audio signal.

15. The method according to claim 14, wherein the fifth time delay for obtaining the sixth modified audio signal is shorter than 0.00007 seconds.

16. The method according to claim 14, wherein performing the signal feedback operation comprises recursively adding an attenuated version of a signal to itself.

17. The method according to claim 14, wherein the first signal attenuation operation is performed in dependence of the virtual depth of the virtual sound source below the observer.

18. The method according to claim 17, wherein said first signal attenuation operation is performed such that a lower the virtual sound source is positioned below the observer, a lower a degree of attenuation that is performed by said signal attenuation operation.

19. The method according to claim 1, wherein the virtual sound source is positioned at a virtual depth below an observer, the method comprising generating the audio signal y(t) using a signal feedback operation that recursively adds a modified version of the input audio signal x(t) to itself, wherein the signal feedback operation comprises a fifth signal delay operation introducing a fifth time delay and a first signal attenuation operation.

20. The method according to claim 1, wherein the virtual sound source is positioned at a virtual depth below an observer, the method comprising:

modifying the input audio signal x(t) to obtain a sixth modified audio signal using a signal feedback operation that recursively adds a modified version of the input audio signal x(t) to itself, wherein the signal feedback operation comprises a fifth signal delay operation introducing a fifth time delay and a first signal attenuation; and generating the audio signal y(t) based on a combination of the sixth modified audio signal and time-delayed and attenuated version of the sixth modified audio signal.

21. The method according to claim 1, further comprising receiving a user input indicative of:

the virtual shape of the virtual sound source;

respective virtual positions of virtual points on the virtual shape of the virtual sound source;

a distance between the virtual sound source and an observer;

a height at which the virtual sound source is positioned above the observer; and/or a depth at which the virtual sound source is positioned below the observer.

22. The method according to claim 1, further comprising generating a user interface enabling a user to input at least one of:

the virtual shape of the virtual sound source;

respective virtual positions of virtual points on the virtual shape of the virtual sound source;

a distance between the virtual sound source and an observer;

a height at which the virtual sound source is positioned above the observer; and a depth at which the virtual sound source is positioned below the observer.

23. A computer comprising:

a computer readable storage medium having computer readable program code embodied therewith; and a processor coupled to the computer readable storage medium, wherein responsive to executing the computer readable program code, the processor is configured to perform the method according to claim 1.

24. A non-transitory computer-readable storage medium storing at least one software code portion, the software code portion, when executed or processed by a computer, is configured to perform the method according to claim 1.

* * * * *